(12) United States Patent
Yoshida et al.

(10) Patent No.: US 8,776,099 B2
(45) Date of Patent: Jul. 8, 2014

(54) DISK DRIVE HAVING A ROTATABLE LID AND A DISK INSERTION OPENING

(75) Inventors: Norikatsu Yoshida, Hyogo (JP); Yasue Chihara, Osaka (JP); Masanori Ohnishi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/878,617

(22) PCT Filed: Jul. 29, 2011

(86) PCT No.: PCT/JP2011/004343
§ 371 (c)(1),
(2), (4) Date: Apr. 10, 2013

(87) PCT Pub. No.: WO2012/049793
PCT Pub. Date: Apr. 19, 2012

(65) Prior Publication Data
US 2013/0212605 A1 Aug. 15, 2013

(30) Foreign Application Priority Data
Oct. 13, 2010 (JP) .................................. 2010-230219

(51) Int. Cl.
*G11B 17/051* (2006.01)
*G11B 33/14* (2006.01)

(52) U.S. Cl.
USPC ........................... 720/647; 720/621; 720/648

(58) Field of Classification Search
USPC ........ 361/679.33–679.39; 720/617, 619–626, 720/646–648, 652–655, 657; 312/9.29–9.61; D14/498–506
See application file for complete search history.

(56) References Cited

U.S. PATENT DOCUMENTS

| 4,368,495 | A | 1/1983 | Hamanaka et al. |
| 5,848,042 | A | 12/1998 | Takahashi et al. |

(Continued)

FOREIGN PATENT DOCUMENTS

| JP | 56-13562 | 2/1981 |
| JP | 7-153159 | 6/1995 |

(Continued)

OTHER PUBLICATIONS

International Search Report (ISR) issued Sep. 6, 2011 in International (PCT) Application No. PCT/JP2011/004343.

(Continued)

*Primary Examiner* — Nathan Danielsen
(74) *Attorney, Agent, or Firm* — Wenderoth, Lind & Ponack, L.L.P.

(57) ABSTRACT

There is provided a disk device that prevents entering of foreign matters, and that forms an opening/closing lid using an inclined surface of a front wall so that the disk device has a design according to which the thickness is not noticeable. A front wall 1*a* of an outer case 1 includes an inclined surface whose front part is inclined downward. An opening portion 1*b* is provided to the front wall 1*a* of the outer case 1, and a lid 2 that covers the opening portion 1*b* while allowing it to be opened or closed is provided. The lid 2 is configured to move, by rotating about a rotation shaft provided in a direction crossing a disk conveyance direction, between a closed lid position 2A in which the lid is flush with the inclined surface such that a disk insertion opening 1*c* is not exposed to the outside and an open lid position 2B in which the disk insertion opening 1*c* is exposed to the outside and a disk 200 is guided to the disk insertion opening 1*c*.

20 Claims, 29 Drawing Sheets

(56) References Cited

U.S. PATENT DOCUMENTS

| 5,859,828 | A | 1/1999 | Ishibashi | |
|---|---|---|---|---|
| 2004/0246387 | A1* | 12/2004 | Horiuchi | 361/682 |
| 2007/0074233 | A1* | 3/2007 | Moriya et al. | 720/647 |
| 2009/0070793 | A1* | 3/2009 | Yoguchi | 720/600 |

FOREIGN PATENT DOCUMENTS

| JP | 9-35464 | 2/1997 |
|---|---|---|
| JP | 9-180332 | 7/1997 |
| JP | 11-273213 | 10/1999 |
| JP | 2010-55670 | 3/2010 |

OTHER PUBLICATIONS

Translation of International Preliminary Report on Patentability mailed May 2, 2013 in International (PCT) Application No. PCT/JP2011/004343.

* cited by examiner

DISK DRIVE HAVING A ROTATABLE LID AND A DISK INSERTION OPENING

TECHNICAL FIELD

The present invention relates to a slot-in disk device configured to load a disk recording medium such as a CD, a DVD, and a BD (hereinafter, referred to as a disk) to a replayable position inside a casing without using a tray.

BACKGROUND ART

Conventionally, this type of disk device is normally configured to have a disk directly inserted into a casing through a disk insertion opening provided at a front surface of the casing (an outer casing). The disk which has been inserted through the disk insertion opening is loaded to a replayable position by a disk conveyance mechanism including a roller and the like.

With this type of disk device, since the disk insertion opening is exposed to the outside, foreign matters such as dust may enter the casing through the disk insertion opening. As a configuration for preventing entering of foreign matters, those disclosed in Patent Document 1 (JP 2010-55670 A), Patent Document 2 (JP 9-180332 A), and Patent Document 3 (JP 9-35464 A) are known, for example.

Patent Document 1 discloses a disk device having, attached to a disk insertion opening, a substantially anti-dust member which is provided with a slit through which a disk may be inserted. Also, the disk device of Patent Document 1 is configured such that after a disk has passed through the slit of the substantially anti-dust member, a lid provided on the inner side of the device than the substantially anti-dust member is rotated and the disk insertion opening is closed.

Also, Patent Document 2 discloses a disk device configured to include a front panel arranged in front of a disk insertion opening, where the disk insertion opening is opened or closed by the raising or lowering the front panel. Furthermore, the disk device of Patent Document 2 includes a protruding guide plate, provided so as to eliminate the difference in height between an upper portion of the front panel and the disk insertion opening in a state where the disk insertion opening is opened by the lowering of the front panel, for making insertion or ejection of a disk into or from the disk insertion opening smooth.

Furthermore, Patent Document 3 discloses a disk device configured to open or close a disk insertion opening by rotating a rotating-sliding lid. The disk device of Patent Document 3 includes a guide surface portion for guiding a disk to the disk insertion opening, and also, includes an auxiliary guide surface portion at a part of the lid for opening or closing the disk insertion opening, and when the disk insertion opening is opened, a disk may be guided to the disk insertion opening by a wide surface including the auxiliary guide surface portion of the lid and the guide surface portion.

PATENT DOCUMENTS

Patent Document 1: JP 2010-55670 A
Patent Document 2: JP 9-180332 A
Patent Document 3: JP 9-35464 A

SUMMARY OF THE INVENTION

Problems to be solved by the Invention

The slot-in disk device described above is, in many cases, used by being integrated with another electrical device such as a television set. As this type of device, a device with a disk device embedded at a side of a television set is well known, for example. Regarding this device, the device of the type according to Patent Document 1 described above is made upright with a disk insertion opening normally provided at a position not visible from the front of the television set so as not to impair the design, for example. Thus, at the time of inserting a disk into the disk insertion opening, the position of the disk insertion opening has to be checked from the side of the television set, and there is an issue with respect to usability. Accordingly, embedding the disk device in a pedestal of a television set is being considered.

A pedestal is, in many cases, designed to be thin and trapezoid-shaped, with an inclined surface at a front wall, and changing this design of the pedestal greatly affects the design of the entire television set. Therefore, a disk device has to be embedded so as not to impair the design of the pedestal. It is needless to say that, if a disk device is embedded in the pedestal, the thickness of the entire pedestal cannot be made thinner than the thickness of the disk device. Also, when considering the insertion and ejection of a disk, the disk device is preferably arranged in the vicinity of the front wall of the pedestal, but this front wall has an inclined surface as described above. Thus, if the disk device is embedded in the pedestal, the thickness of the disk device may impose an adverse effect on the design.

According to the disk device of Patent Document 1, the disk insertion opening is exposed to the outside, and embedding of the disk device, as it is, into a pedestal having an inclined surface on the front wall is not desirable from the standpoint of design. Also, if the disk device of Patent Document 1 is embedded as it is, foreign matters such as dust may easily enter the device through a slit of a substantially anti-dust member.

According to the disk device of Patent Document 2, the disk insertion opening may be closed by a front panel, and entering of foreign matters may be better suppressed. However, the front panel of the disk device of Patent Document 2 extends in a vertical direction in a state where the disk insertion opening is closed. Thus, if the disk device is embedded in a pedestal, the thickness of the pedestal is emphasized, and if applied to a pedestal having an inclined surface as described above, an adverse effect may be imposed on the design.

According to the disk device of Patent Document 3, the disk insertion opening may be closed by a rotating-sliding lid, and entering of foreign matters may be better suppressed. However, the disk device of Patent Document 3 is configured to rotate the lid about a rotation shaft provided below the disk insertion opening, and the design of the front wall of the disk device is limited to an arc shape. Thus, if the disk device of Patent Document 3 is embedded in a pedestal, the thickness of the pedestal is emphasized, and if applied to a pedestal having an inclined surface as described above, an adverse effect may be imposed on the design.

Accordingly, the object of the present invention is to solve the problems described above, and to provide a disk device which prevents entering of foreign matters, and which is embedded in an outer case designed with an inclined surface on a front wall, the disk device having a design according to which the thickness is not noticeable.

Means to Solve the Problems

In order to achieve the above object, the present invention is formed as follows.

According to the present invention, there is provided a slot-in disk device including:

a disk conveyance mechanism which conveys a disk inserted from a disk insertion opening to a replayable position; and a disk installation mechanism which installs the disk conveyed to the replayable position on a turntable such that the disk is in a replayable clamping state, wherein a front wall of an outer case of the disk device includes an inclined surface whose front part is inclined downward, wherein the front wall of the outer case is provided with an opening portion allowing insertion of the disk into the disk insertion opening, and a lid covering the opening portion while allowing the opening portion to be opened or closed, and wherein the lid is configured to move, by rotating about a rotation shaft provided at a side of the opening portion in front of the disk insertion opening and in a direction crossing a disk conveyance direction, between a closed lid position in which the lid is flush with the inclined surface such that the disk insertion opening is not exposed to outside and an open lid position in which the disk insertion opening is exposed to outside and the disk is guided to the disk insertion opening.

Effects of the Invention

According to the present invention, there may be provided a disk device which, by having the configuration described above, prevents entering of foreign matters, and which is embedded in an outer case having an inclined surface on a front wall and which forms an opening/closing lid using the inclined surface of the front wall, the disk device having a design according to which the thickness is not noticeable.

BRIEF DESCRIPTION OF THE DRAWINGS

These aspects and features of the invention will be apparent from the following description concerning preferred embodiments with respect to the accompanying drawings, in which.

MODES FOR CARRYING OUT THE INVENTION

Figure 1A:
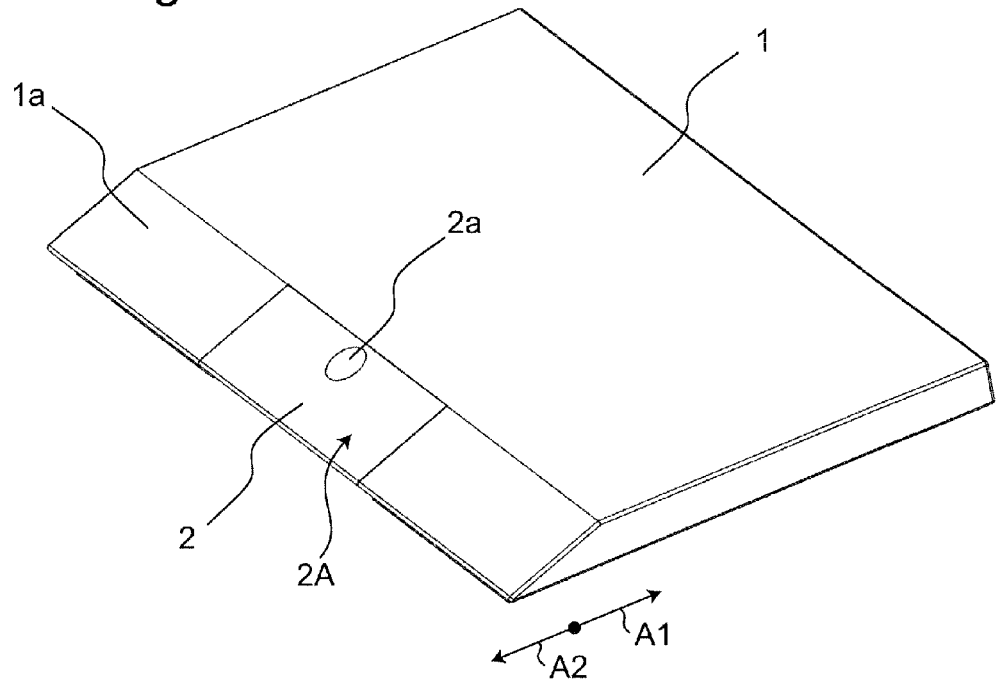
FIG. 1A is a perspective view of a disk device according to a first embodiment of the present invention, and is a view showing a state where a lid is positioned in a closed lid position.

According to a first aspect of the present invention, there is provided a slot-in disk device comprising:

a disk conveyance mechanism which conveys a disk inserted from a disk insertion opening to a replayable position; and a disk installation mechanism which installs the disk conveyed to the replayable position on a turntable such that the disk is in a replayable clamping state, wherein a front wall of an outer case of the disk device includes an inclined surface whose front part is inclined downward, wherein the front wall of the outer case is provided with an opening portion allowing insertion of the disk into the disk insertion opening, and a lid covering the opening portion while allowing the opening portion to be opened or closed, and wherein the lid is configured to move, by rotating about a rotation shaft provided at a side of the opening portion in front of the disk insertion opening and in a direction crossing a disk conveyance direction, between a closed lid position in which the lid is flush with the inclined surface such that the disk insertion opening is not exposed to outside and an open lid position in which the disk insertion opening is exposed to outside and the disk is guided to the disk insertion opening.

According to a second aspect of the present invention, there is provided the disk device according to the first aspect, wherein the lid is configured to rotate to the open lid position by being pressed, in a state of being positioned in the closed lid position, at a part more to a side of the disk insertion opening than the rotation shaft, and to rotate to the closed lid position by being pressed, in a state of being positioned in the open lid position, at a part away from the disk insertion opening than the rotation shaft.

According to a third aspect of the present invention, there is provided the disk device according to the first or second aspect, wherein the disk conveyance mechanism is configured eject the disk conveyed to the replayable position to the disk insertion opening, and wherein a concave portion into which a finger enters is provided to a part of the lid that faces a hole formed at a center of the disk ejected from the disk insertion opening by the disk conveyance mechanism when the lid is positioned in the open lid position.

According to a fourth aspect of the present invention, there is provided the disk device according to any one of the first to third aspects, wherein the disk conveyance mechanism includes a plurality of disk conveying rollers which convey the disk inserted from the disk insertion opening to the replayable position, wherein an anti-dust cover formed from an elastic sheet provided with a slit through which the disk passes is attached to the disk insertion opening, and wherein, when the disk is inserted into the slit and supported by the elastic sheet, and is nipped by the plurality of disk conveying rollers, the disk and the lid are in a non-contact state with each other.

According to a fifth aspect of the present invention, there is provided the disk device according to any one of the first to fourth aspects, wherein the outer case forms a pedestal of a television set.

According to a sixth aspect of the present invention, there is provided the disk device according to any one of the first to fifth aspects, further including:

a retaining mechanism which retains the lid which has been moved to the closed lid position in the closed lid position, and which retains the lid which has been moved to the open lid position in the open lid position; and a lid opening/closing switching mechanism which switches a retaining state by the retaining mechanism in association with opening or closing of the lid, wherein, when the disk installation mechanism operates to install the disk on the turntable in a state where the lid is positioned in the open lid position, the retaining mechanism is switched, in conjunction with the operation and by the lid opening/closing switching mechanism, from a state where the retaining mechanism retains the lid in the open lid position to a state where the retaining mechanism retains the lid in the closed lid position.

According to a seventh aspect of the present invention, there is provided the disk device according to the sixth aspect, wherein the disk conveyance mechanism is configured to eject the disk conveyed to the replayable position to the disk insertion opening, and wherein, when the lid is moved from the closed lid position to the open lid position in a state where the disk is installed on the turntable, the disk conveyance mechanism ejects the disk to the disk insertion opening, and the lid is retained in the open lid position without a state where the retaining mechanism retains the lid in the open lid position being switched.

According to an eighth aspect of the present invention, there is provided the disk device according to the seventh aspect, wherein the lid opening/closing switching mechanism includes a one-way clutch that acts only at a time of disk insertion and that switches from a retaining state of the open lid position by the retaining mechanism to a retaining state of the closed lid position.

Before describing the present invention, the same parts in the attached drawings are given the same reference symbols.

Hereinafter, embodiments of the present invention will be described with reference to the drawings.

(First Embodiment)

Figure 1B:
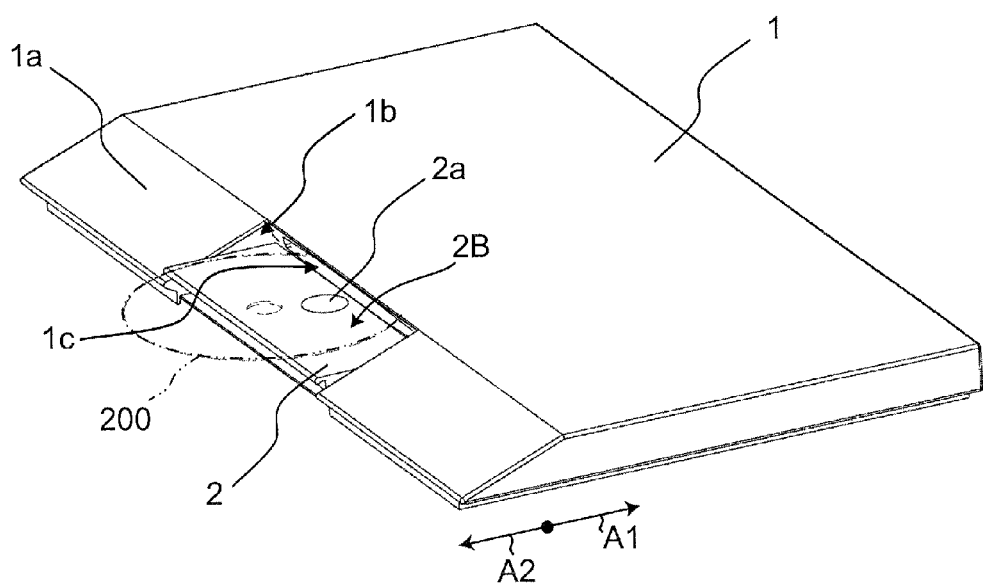
FIG. 1B is a perspective view of the disk device according to the first embodiment of the present invention, and is a view showing a state where the lid is positioned in an open lid position.

Hereinafter, a disk device according to a first embodiment of the present invention will be described. FIGS. 1A and 1B are perspective views of a disk device according to a first embodiment of the present invention.

In FIGS. 1A and 1B, "1" is an outer case of the disk device according to the first embodiment, and a front wall 1a of the outer case 1 has an inclined surface that is inclined such that its lower part is the forward part. An opening portion 1b through which a disk 200 which is inserted can pass is provided to the front wall 1a, and a lid 2 is provided so as to cover the opening portion 1b. The lid 2 is rotatably provided with a direction orthogonal to an arrow A1 or A2 direction, which is a disk conveying direction, as a rotation axis. The rotation axis of the lid 2 is along the left and right of the lid 2, and is arranged at a side of the opening portion 1b, on one side of the front of the disk device (on the side of the arrow A2 direction). The opening portion 1b may be opened or closed by the rotation of the lid 2. FIG. 1A shows a state where the lid 2 has closed the opening portion 1b, and FIG. 1B shows a state where the lid 2 has opened the opening portion 1b.

As shown in FIG. 1A, in a state where the opening portion 1b is closed, the lid 2 is positioned in a closed lid position 2A where its upper surface is substantially flush with the inclined surface of the front wall 1a. On the other hand, as shown in FIG. 1B, in a state where the opening portion 1b is opened, the lid 2 is positioned in an open lid position 2B where its upper surface is substantially parallel to the arrow A1 or A2 direction. When the lid 2 is positioned in the open lid position 2B, a disk insertion opening 1c provided on the side of the arrow A1 direction than the lid 2 is exposed to the outside. At this time, the upper surface of the lid 2 functions as a guide that guides the disk 200 to the disk insertion opening 1c.

Also, a concave portion 2a into which a finger enters is provided to the upper surface of the lid 2. The concave portion 2a is formed at a position that corresponds to a hole formed at the center of the disk 200 when the disk 200 is ejected from the disk insertion opening 1c. Accordingly, if a user puts his/her finger into the concave portion 2a through the hole of the disk 200, the disk 200 can be easily held. Also, the concave portion 2a acts as an indicator at the time of a user pressing the lid 2 to rotate the lid 2 from the closed lid position 2A to the open lid position 2B.

Figure 2:
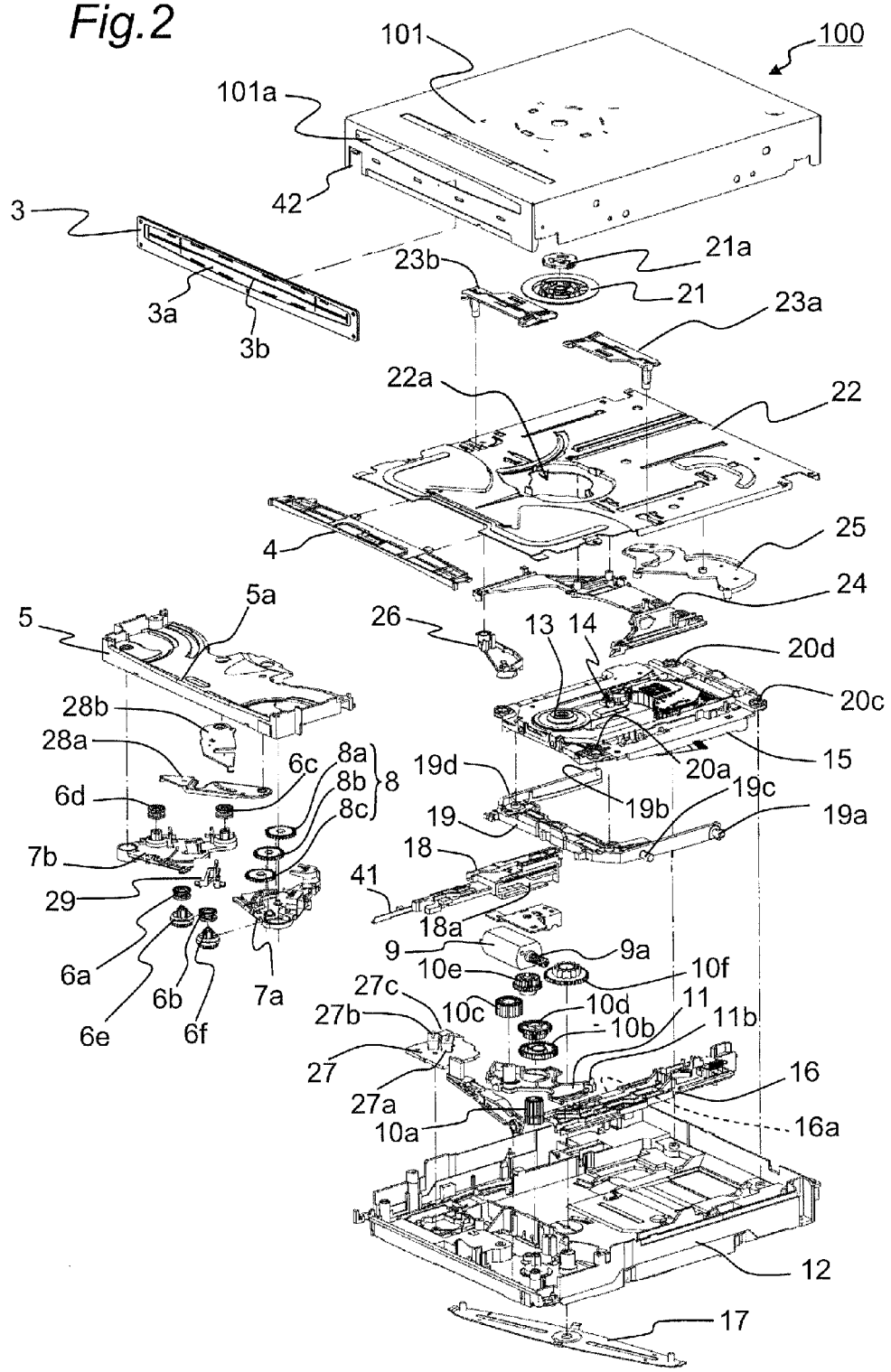
FIG. 2 is an exploded perspective view of a disk drive unit embedded in the disk device according to the first embodiment of the present invention.
Figure 3:
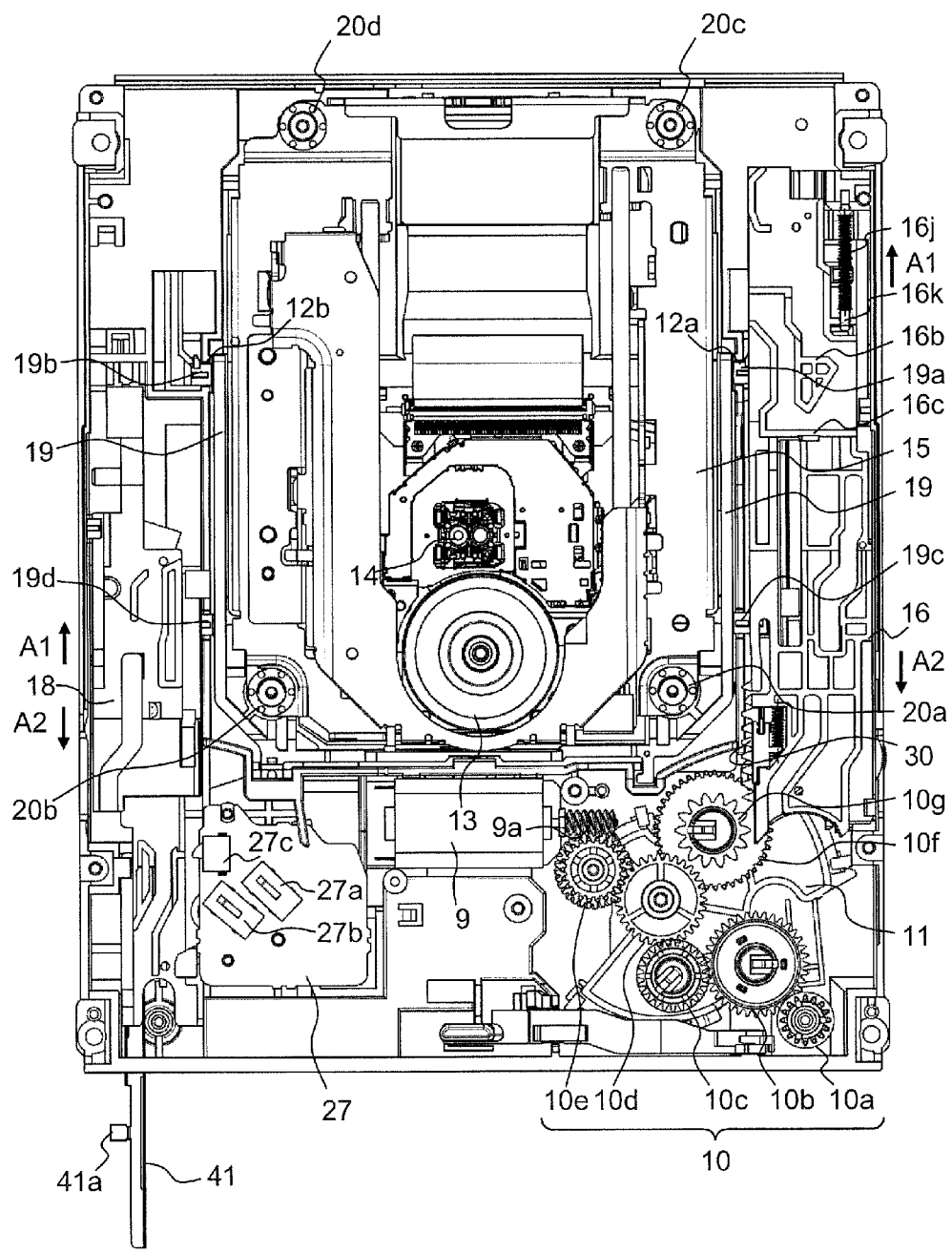
FIG. 3 is a plan view showing an internal configuration of the disk drive unit shown in FIG. 2.

Next, the configuration of a disk drive unit 100 embedded in the outer case 1 described above will be described with reference to FIGS. 2 and 3. FIG. 2 is an exploded perspective view of the disk drive unit 100. FIG. 3 is a top view showing an internal configuration of the disk drive unit 100. The disk drive unit 100 is a slot-in device configured to load the disk 200 to a replayable position inside a casing without using a tray.

As shown in FIG. 2, the disk drive unit 100 includes a casing 101 serving as an outer shell of the unit. An opening portion 101a for insertion and ejection of the disk 200 is provided on a front surface of the casing 101. The disk insertion opening 1c described above is configured by the opening portion 101a and a disk insertion hole 44a of a chassis member 44 described later. The opening portion 101a is closed by an anti-dust cover 3. The anti-dust cover 3 is provided with an elastic sheet 3a made of felt or the like. A slit 3b through which the disk 200 can pass is formed substantially at the center of the elastic sheet 3a (at a position facing the opening portion 101a). A front end of the disk 200 is inserted into the casing 101 through the slit 3b and the opening portion 101a while elastically deforming the anti-dust cover 3, so that a disk conveyance mechanism arranged in the casing 101 and described later is driven and the disk 200 is conveyed to a replayable position.

Figure 9A:
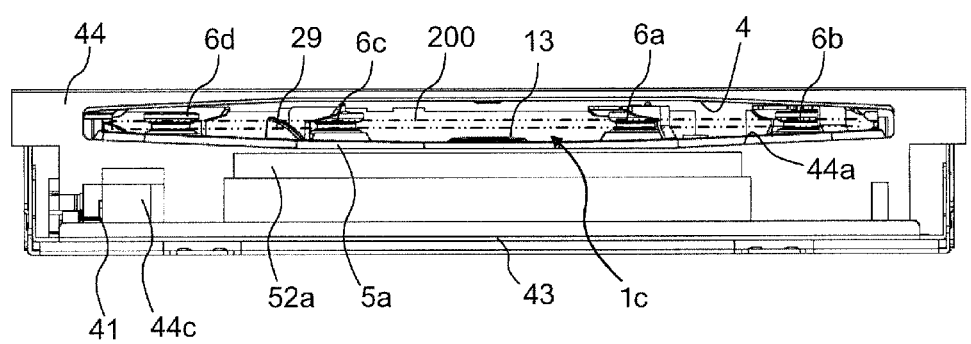
FIG. 9A is front view showing a positional relationship of an opening portion of the disk drive unit and the chassis member.

An upper guide 4 for guiding the upper side of the disk 200, and a guide portion 5a of a roller base 5 for guiding the lower side of the disk 200 are provided in the vicinity of the opening portion 101a of the casing 101 (refer to FIG. 9A). The roller base 5 rotatably retains a pair of roller arms 7a, 7b functioning as a guide and a drive force transmission portion for conveying the disk 200 into the casing 101 (refer to FIG. 10). A pair of rubber rollers 6a, 6b, serving as disk conveying rollers, is rotatably provided to the roller arm 7a. A pair of rubber rollers 6c, 6d, serving as disk conveying rollers, is fixed to the roller arm 7b. The rubber roller 6a is integrated with a roller gear 6e. The rubber roller 6b is integrated with a roller gear 6f.

Figure 15:
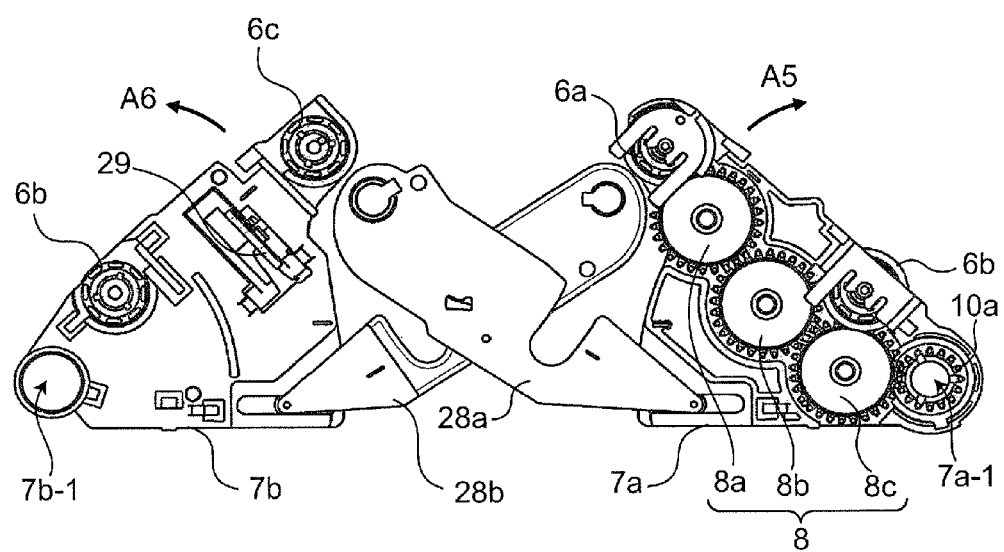
FIG. 15 is a top view showing an attachment state of a pair of roller arms and a pair of link arms.

A gear row 8 formed by gears 8a to 8c is provided to the roller arm 7a (refer to FIG. 15). The gear 8c is meshed with a gear 10a in a gear row 10 formed by gears 10a to 10e shown in FIG. 3. The gear 10e is meshed with a worm gear 9a provided in a motor 9 serving as one example of a drive source. Accordingly, drive force of the motor 9 is transmitted to the gear row 8 via the worm gear 9a, the gears 10e, 10d, 10c, 10b, and 10a in the gear row 10.

Also, since a gear 10f is meshed with a lower portion of the gear 10d, the drive force of the motor 9 is transmitted at the same time. A pinion 10g is coaxially integrated with this gear 10f. The pinion 10g is capable of being meshed with a rack 30 provided to a slide cam member 16 to be described later. However, in an initial state that the disk 200 is not inserted, the pinion 10g is not meshed with the rack 30.

Furthermore, the gear 10c is rotatably and axially supported by a clutch plate 11. The clutch plate 11 is rotatably provided with the up and down direction (also referred to as the thickness direction) as a rotation axis thereof. As described later, rotation of the clutch plate 11 is performed by sliding of the slide cam member 16 in an arrow A2 direction. By the rotation of the clutch plate 11, the gear 10c moves, meshing with the gear 10b is released, and the drive force is transmitted only to the gear 10f and the coaxial pinion 10g. The roller base 5, the gear row 8, the motor 9, and the gear row 10 are rotatably or slidably retained on a mechanical chassis 12 arranged in the casing 101 according to need.

Furthermore, as shown in FIG. 2, a turntable 13 on which the disk 200 is to be mounted and a traverse mechanism (hereinafter referred to as the traverse) 15 having an optical pickup 14 and a mechanism for driving the same are arranged inside the casing 101. The turntable 13 is integrated with a spindle motor (not shown) for generating rotation force to rotate the disk 200. The traverse base 15 is rotatable in the up and down direction and floated and supported on the mechanical chassis 12 with fixed elasticity. By rotation of the traverse base 15 in the up and down direction, the disk 200 conveyed to the replayable position can be installed onto the turntable 13.

As shown in FIG. 3, on the right side of the mechanical chassis 12, the slide cam member 16 is provided slidably in an arrow A1 or A2 direction. On the left side of the mechanical chassis 12, a slide cam member 18 is provided slidably in the arrow A1 or A2 direction. The slide cam member 16 and the slide cam member 18 are coupled by a link arm 17 (refer to FIG. 2) which is rotatably supported on a lower part of the mechanical chassis 12, and formed to slide in the opposite directions to each other by rotation of the link arm 17.

An intermediate chassis 19 for supporting the traverse base 15 is axially supported by pins 19a, 19b and thus rotatably provided in the mechanical chassis 12. Pins 19c, 19d to be engaged with raising and lowering cams 16a, 18a (refer to FIG. 2) formed to the slide cam members 16, 18 are provided to the intermediate chassis 19. The slide cam members 16, 18 slide in the opposite directions to each other, so that the pins 19c, 19d move along the raising and lowering cams 16a, 18a and thus are raised or lowered, and the intermediate chassis 19 is rotated taking the pins 19a, 19b as a rotation axis.

A front part of the traverse base 15 (on the side of the disk insertion opening 1c) is fixed to a front part of the intermediate chassis 19 at one point on the left side and at one point on the right side via floating rubbers 20a, 20b. A rear part of the traverse base 15 is floated and supported on the mechanical chassis 12 via floating rubbers 20c, 20d. The intermediate chassis 19 is rotated taking the pins 19a, 19b as the rotation axis, so that the traverse base 15 is rotated taking the floating rubbers 20d, 20c as a rotation axis. In accordance with this rotating operation of the traverse base 15, the turntable 13 is raised or lowered.

Above the turntable 13, an upper base 22 is arranged so as to cover an upper part of the traverse base 15. An opening portion 22a is provided in the upper base 22 at a position facing the turntable 13. To the upper base 22, facing clamper lifters 23a, 23b sandwiching the opening portion 22a is provided slidably in the direction in which the clamper lifters are brought close to or away from each other. Above the turntable 13, a clamper 21 for clamping the disk 200 onto the turntable 13 is provided.

When the pair of clamper lifters 23a, 23b is placed close to each other, the damper 21 is supported on ends of the damper lifters 23a, 23b. At this time, the clamper 21 is in a non-contact state with the disk 200 mounted on the turntable 13. When the pair of clamper lifters 23a, 23b moves in the direction in which the clamper lifters are brought away from each other from this state, the damper 21 moves close to the turntable 13 through the opening portion 22a.

A metal yoke 21a is provided in the clamper 21. A magnet provided in the turntable 13 attracts the metal yoke 21a with magnetic force in a state that the disk 200 is mounted on the turntable 13, so that the disk 200 is nipped between the clamper 21 and the turntable 13. Thereby, the disk 200 is installed onto the turntable 13 and brought into a replayable clamping state. When the pair of clamper lifters 23a, 23b moves in the direction in which the clamper lifters are brought close to each other from this clamping state, the clamper 21 pressed by the pair of damper lifters 23a, 23b due to the movement moves away from the turntable 13 against the magnetic force. Thereby, the clamping state is cancelled.

A centering member 24 for centering the disk 200 toward the replayable position is slidably provided on a lower surface of the upper base 22. A trigger lever 25 rotated by being brought into contact with and pressed by the disk 200 conveyed to the replayable position is rotatably provided on the lower surface of the upper base 22 (refer to FIGS. 13 and 14). A guide lever 26 for stably retaining the disk 200 inserted into the casing 101 between the turntable 13 and the damper 21 is rotatably provided on the lower surface of the upper base 22. The upper base 22 is fixed to the mechanical chassis 12. The mechanical chassis 12 is fixed to the casing 101.

A substrate 27 onto which detection switches 27a to 27c are disposed is attached to the mechanical chassis 12 (refer to FIG. 3). The detection switch 27a is a switch for detecting the disk 200 inserted through the opening portion 101a (the disk insertion opening 1c). The detection switch 27a is a switch for detecting the disk 200 inserted through the opening portion 101a. As shown in FIG. 15, the detection switch 27a is operated by a disk detection lever 29 provided to the roller arm 7b. The detection switch 27b is a switch for detecting that a disk conveyance operation is finished at the time of the ejection of the disk 200. The detection switch 27b is operated by a lower surface of the roller arm 7b rotating at the time of inserting and ejecting the disk 200. The detection switch 27c is a switch for detecting that the disk 200 has been conveyed to the replayable position and installed on the turntable 13. The detection switch 27c is operated by the slide cam member 18. The substrate 27 is provided at a position facing the roller arm 7b attached to the roller base 5.

Figure 16A:
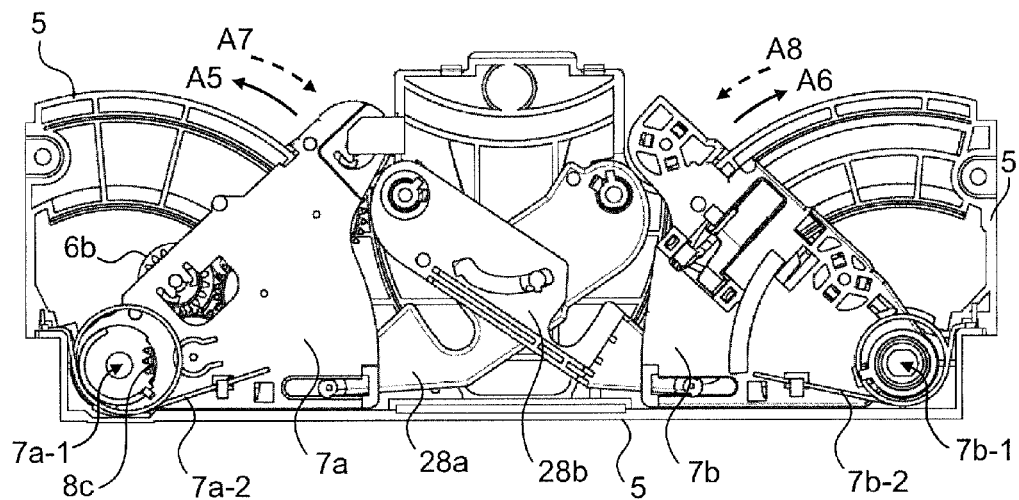
FIG. 16A is a bottom view showing a state that the pair of roller arms is rotated in the direction in which the roller arms are brought close to each other.
Figure 16B:
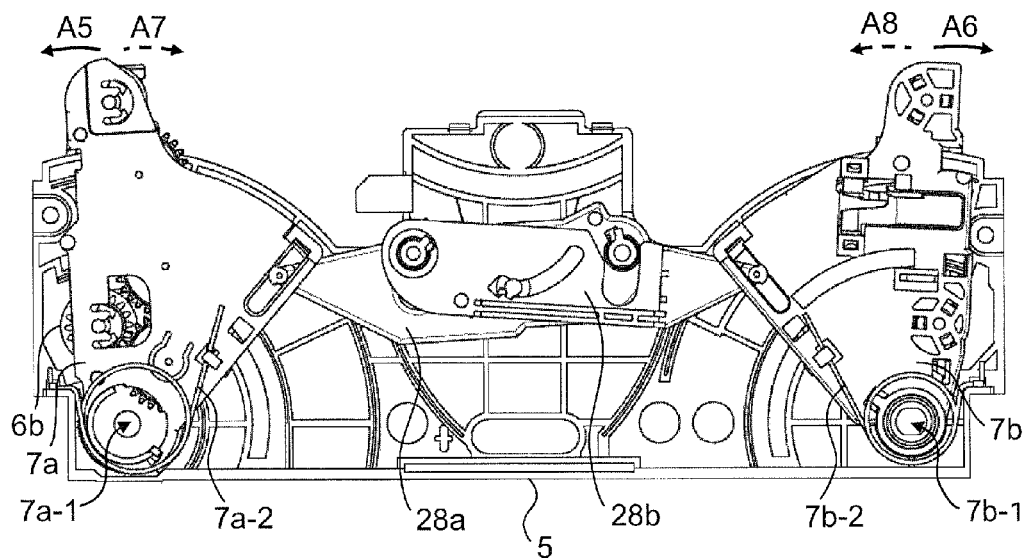
FIG. 16B is a bottom view showing a state that the pair of roller arms is rotated in the direction in which the roller arms are brought away from each other.

As shown in FIGS. 15, 16A, and 16B, link arms 28a, 28b are rotatably provided to the roller base 5. The link arms 28a, 28b are engaged with the roller arms 7a, 7b so as to rotate the roller arms 7a, 7b in synchronization with each other. The roller arm 7a is provided rotatably in an arrow A5 direction and an arrow A7 direction about a rotation shaft 7a-1. This roller arm 7a is biased in the A7 direction by a torsion coil spring 7a-2. The roller arm 7b is provided rotatably in an arrow A6 direction and an arrow A8 direction about a rotation shaft 7b-1. This roller arm 7b is biased in the arrow A8 direction by a torsion coil spring 7b-2.

It is noted that in the first embodiment, the disk conveyance mechanism for conveying the disk 200 to the replayable position is formed by the gear row 10, the gear row 8, the rubber rollers 6a to 6d, the roller gears 6e, 6f, the roller arms 7a, 7b, and the link arms 28a, 28b. In the first embodiment, a disk installment mechanism for installing the disk 200 conveyed to the replayable position onto the turntable 13 so as to bring the disk into the replayable clamping state is formed by the gears 10d to 10f, the pinion 10g, the slide cam member 16, the link arm 17, the slide cam member 18, the intermediate chassis 19, the traverse 15, the floating rubbers 20a to 20d, the clamper 21, the upper base 22, and the clamper lifters 23a, 23b. In the first embodiment, a transmission route switching mechanism for switching a transmission route of the drive force so that the drive force generated by the drive source is transmitted only to one of the disk conveyance mechanism and the disk installment mechanism is formed by the clutch plate 11, the slide cam member 16 for driving this clutch plate, and the trigger lever 25. The motor 9 serving as the drive source and the worm gear 9a serve as common constituent parts relating to drive of the mechanisms, and there are some parts such as the gear row 10 part of which is used for the drive of a plurality of mechanisms. It is noted that the disk conveyance mechanism, the disk installment mechanism, and the transmission route switching mechanism of the present invention are not limited to the above described configurations, needless to say.

Next, the configuration of the disk drive unit 100 will be described in greater detail with reference to FIGS. 2 and 3. FIG. 3 is the top view showing a state that parts excluding the casing 101, those parts relating to the roller base 5, and parts relating to the upper base 22 are attached to the mechanical chassis 12 in the entire configuration shown in FIG. 2.

As shown in FIG. 3, the turntable 13 and the optical pickup 14 are arranged on the traverse 15, substantially at the center of the disk drive unit 100. The intermediate chassis 19 in a substantially U shape is arranged so as to surround the front part and both side parts of the traverse base 15. The slide cam member 16 is arranged on the right side of the intermediate chassis 19. The slide cam member 18 is arranged on the left side of the intermediate chassis 19. The slide cam member 16 and the slide cam member 18 are arranged slidably in the front and rear direction (the arrow A1 and A2 directions) which is the same as the conveying direction of the disk 200. In the initial state that the disk 200 is not conveyed, the slide cam member 16 is biased in the arrow A1 direction by a spring 16j extended between the mechanical chassis 12 and the slide cam member 16. The slide cam member 18 connected to the slide cam member 16 via the link arm 17 is biased in the arrow A2 direction. The pins 19c, 19d provided at both ends of the front part of the intermediate chassis 19 are slidably engaged with the raising and lowering cams 16a, 18a formed to the slide cam members 16, 18 (refer to FIG. 2). The pins 19a, 19b provided at both ends of a rear part of the intermediate chassis 19 are rotatably retained on bearing portions 12a, 12b formed to the mechanical chassis 12. With this configuration, the slide cam members 16, 18 slide in the opposite directions to each other, so that the intermediate chassis 19 is rotated taking the pins 19*a*, 19*b* as the rotation axis and the front part of the intermediate chassis 19 is raised or lowered.

Sliding of the slide cam members 16, 18 in the opposite directions to each other is performed by transmitting the drive force of the motor 9 to the pinion 10*g* via the worm gear 9*a*, and the gears 10*e*, 10*d*, 10*f* in a state that the rack 30 of the slide cam member 16 and the pinion 10*g* are meshed with each other. The trigger lever 25 is rotated by being pressed by the disk 200 conveyed to the replayable position on the turntable 13, and the slide cam member 16 is pressed by the trigger lever 25 and thus slightly slides in the arrow A2 direction, so that the pinion 10*g* is meshed with the rack 30.

That is, when the disk 200 is conveyed to the replayable position with the drive of the motor 9, by an action of the trigger lever 25 and transmission switching of the drive force of the motor 9, the slide cam members 16, 18 slide in the opposite directions to each other. Thereby, the intermediate chassis 19 and the traverse base 15 are raised, and the disk 200 is installed onto the turntable 13 and thus brought into the replayable clamping state.

Figure 4:
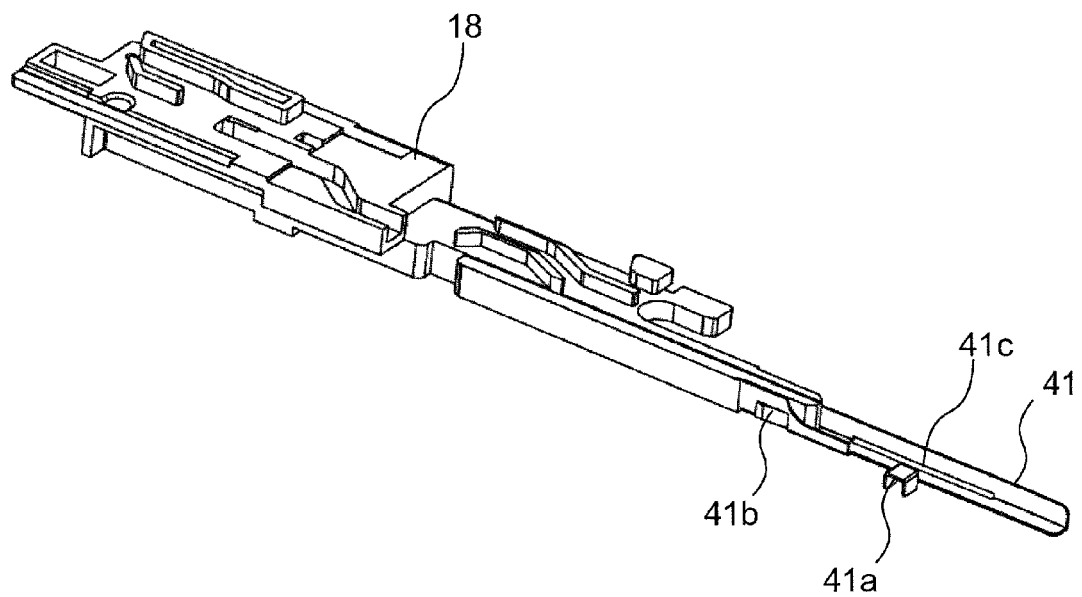
FIG. 4 is a perspective view of a slide cam member provided with a connecting rod.
Figure 5:
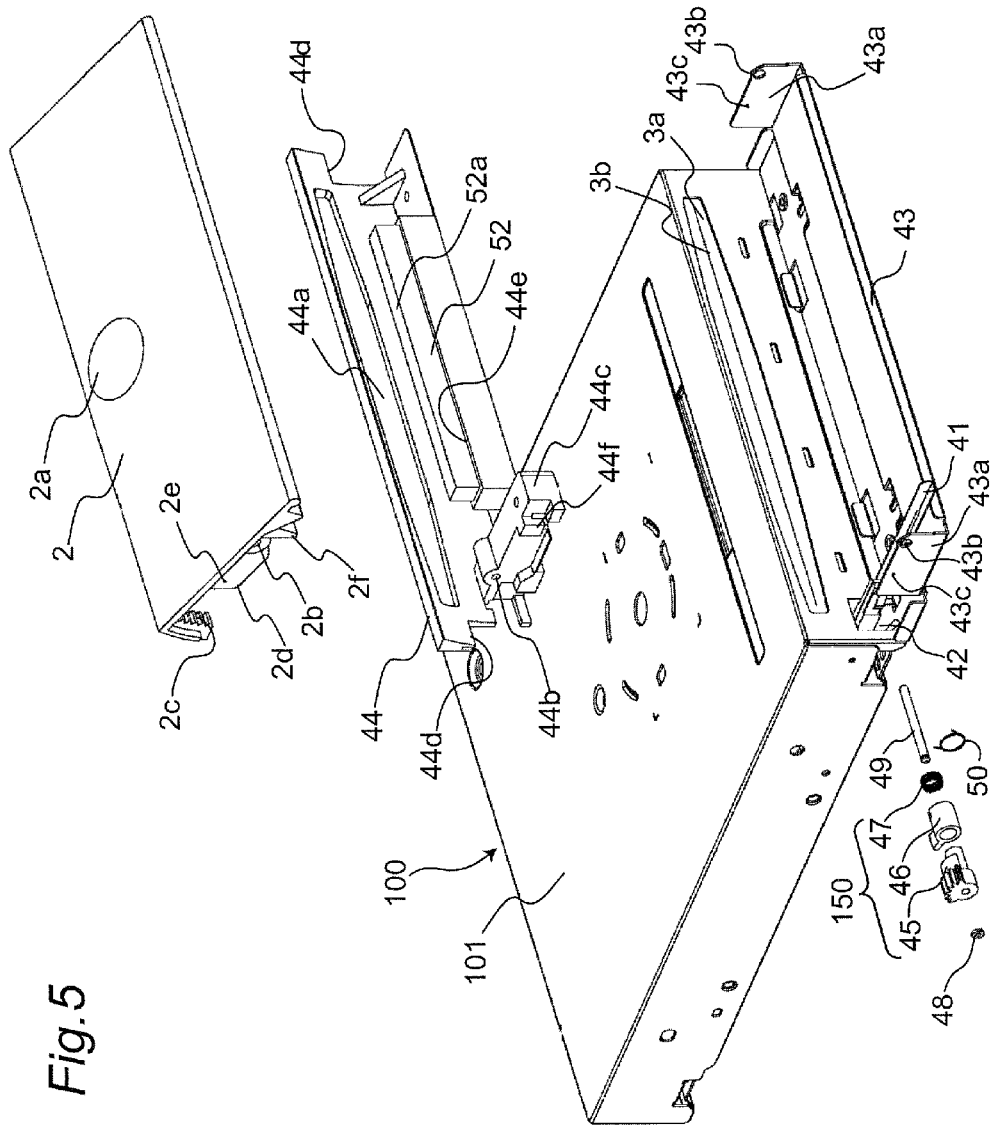
FIG. 5 is an exploded perspective view showing a configuration of parts related to the lid.

Furthermore, as shown in FIG. 4, a connecting rod 41 is integrally provided to one end of the slide cam member 18. As shown in FIG. 5, the connecting rod 41 is provided so as to protrude to the front through a cutout portion 42 formed to the casing 101 of the disk drive unit 100. The connecting rod 41 moves together with the slide cam member 18 that moves according to an operation of installing or detaching the disk 200 on or from the turntable 13. An operation of opening or closing the lid 2 is performed using the movement of the connecting rod 41, as described later. The connecting rod 41 is formed by bending a sheet metal into an L shape. Also, as shown in FIG. 4, the connecting rod 41 includes a protruding portion 41*a* protruding in a direction crossing the movement direction of the slide cam member 18. The protruding portion 41*a* is provided at a position where it is allowed to bring into contact with an arm portion 46*a* of a lid opening/closing arm 46 described later. A base portion 41*b* of the connecting rod 41 is fitted into one end of the slide cam member 18. A slit 41*c* is formed to the connecting rod 41 so as to allow elastic deformation of the connecting rod 41.

Figure 6:
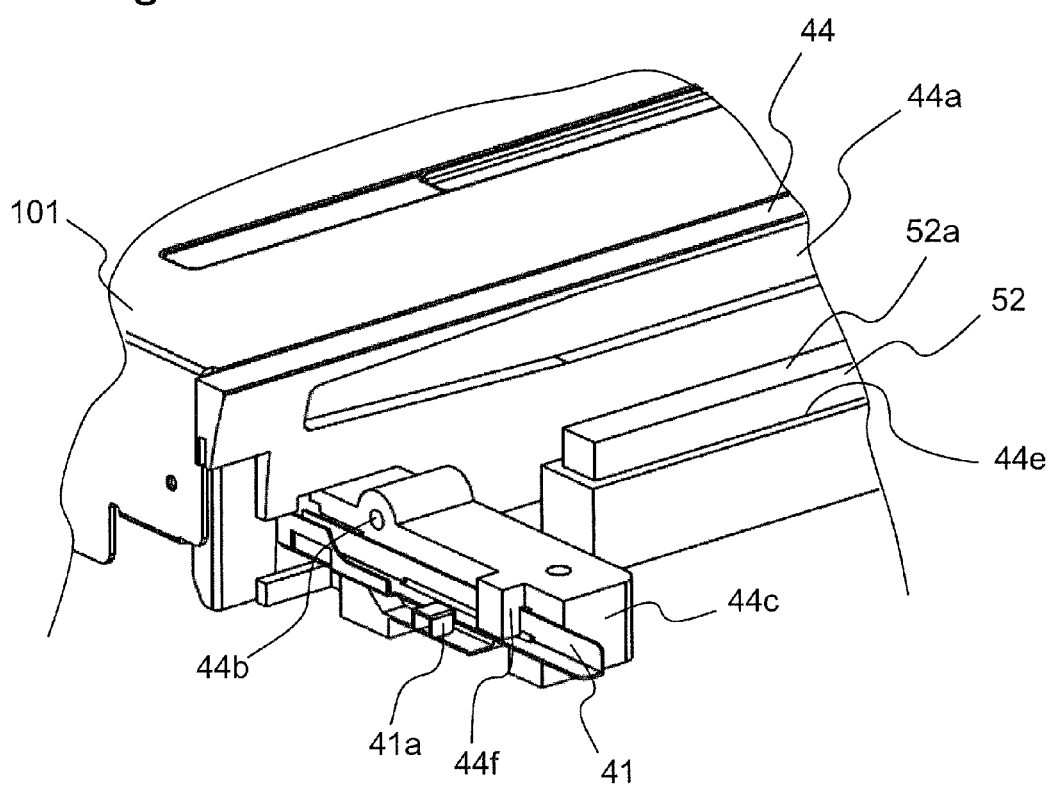
FIG. 6 is an enlarged perspective view showing a state where a chassis member is attached to a front portion of the disk drive unit shown in FIG. 2.
Figure 7A:
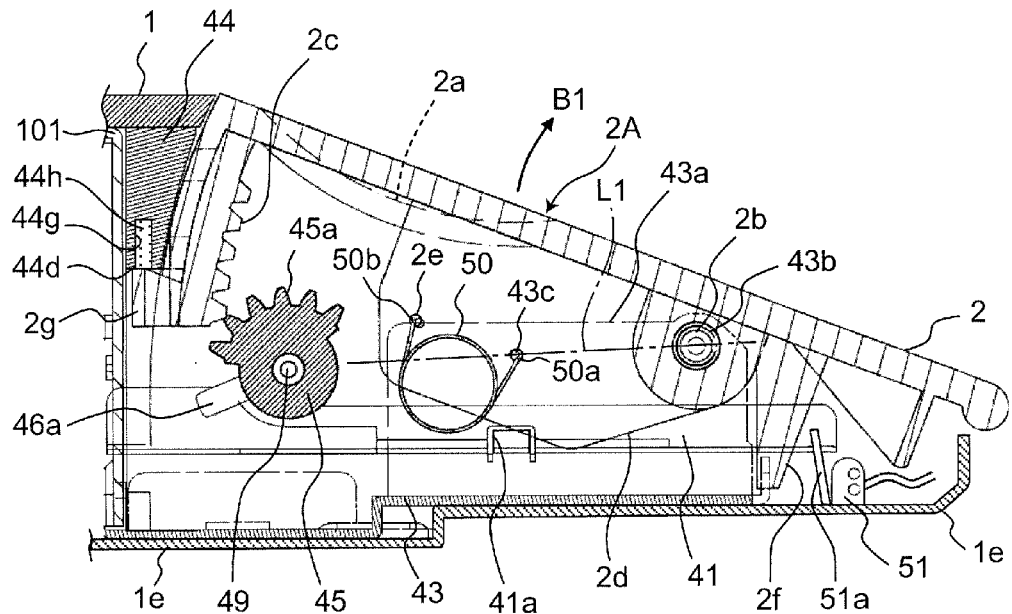
FIG. 7A is a sectional view showing a configuration of parts related to the lid where the lid is positioned in the closed lid position.
Figure 7B:
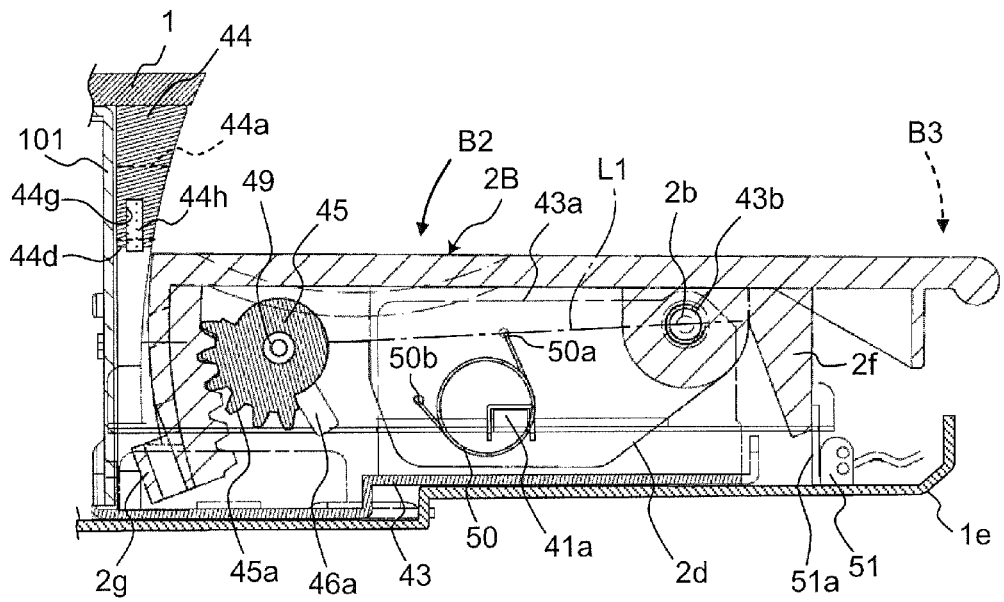
FIG. 7B is a sectional view showing a configuration of parts related to the lid where the lid is positioned in the open lid position.
Figure 8A:
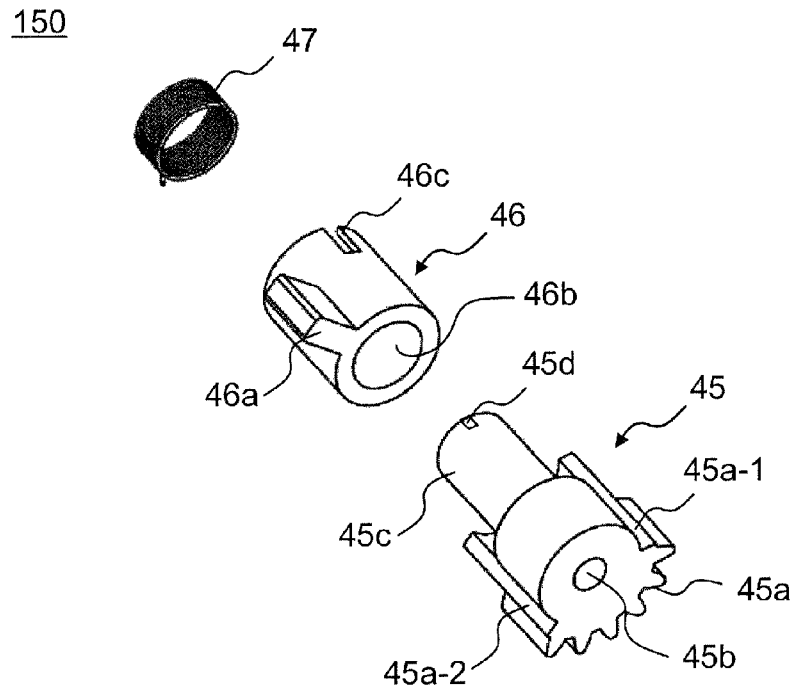
FIG. 8A is an exploded perspective view showing a configuration of a lid opening/closing gear block.
Figure 8B:
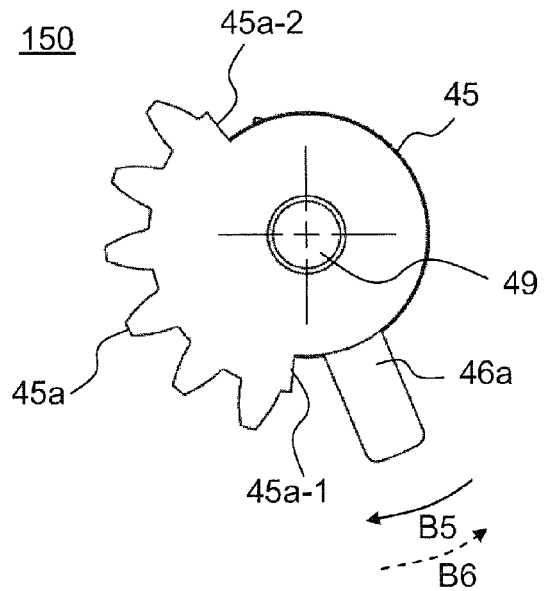
FIG. 8B is a side view of the lid opening/closing gear block.
Figure 9B:
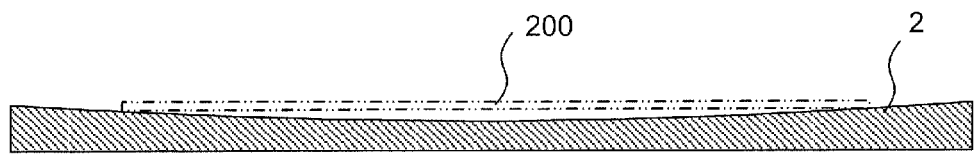
FIG. 9B is a sectional view showing a positional relationship of the lid and a disk.

Next, a configuration of parts related to the lid 2 will be described with reference to FIGS. 5 to 9B. FIG. 5 is an exploded perspective view showing configurations of parts relating to the lid 2. FIG. 6 is an enlarged perspective view showing a state where the chassis member 44 is attached to a front portion of the disk drive unit 100. FIG. 7A is a sectional view showing a configuration of parts related to the lid 2 where the lid 2 is positioned in the closed lid position 2A. FIG. 7B is a sectional view showing a configuration of parts related to the lid 2 where the lid 2 is positioned in the open lid position 2B. FIG. 8A is an exploded perspective view showing a configuration of a lid opening/closing gear block. FIG. 8B is a side view of the lid opening/closing gear block. FIG. 9A is front view showing a positional relationship of the opening portion 101*a* of the disk drive unit 100 and the chassis member 44. FIG. 9B is a sectional view showing a positional relationship of the lid 2 and the disk 200.

As shown in FIG. 5, a frame 43 is arranged at the front of the disk drive unit 100. As shown in FIGS. 7A and 7B, the frame 43 is provided on a bottom wall 1*e* substantially facing the opening portion 1*b* of the outer case 1.

A bearing plate 43*a* is formed at both ends of the frame 43. A shaft hole 43*b* is formed to each bearing plate 43*a*. Rotation shafts 2*b*, 2*b* provided at both ends of the lid 2 are inserted into the shaft holes 43*b*, 43*b*. The lid 2 is thereby rotatably and axially supported by the frame 43. Also, an internal gear 2*c* is formed, protruding in an arc shape with the rotation shaft 2*b* as the center, on the bottom surface at an end of the lid 2 on the disk drive unit 100 side. At the bottom surfaces of both sides of the lid 2, side plate portions 2*d* provided substantially parallel to the bearing plate 43*a* are formed. Also, the chassis member 44 is provided on the frame 43.

The disk insertion hole 44*a* is formed to the chassis member 44. The disk insertion opening 1*c* shown in FIG. 1B is formed by the disk insertion hole 44*a* and the opening portion 101*a* described above. As shown in FIG. 9A, the upper guide 4 and the guide portion 5*a* of the roller base 5 forming the opening portion 101*a* have guide surfaces that are gently curved into a concave shape. Similarly, the disk insertion hole 44*a* has a guide surface that is gently curved into a concave shape. The disk 200 is conveyed inside the disk drive unit 100 while being guided by the peripheral portion of the slit 3*b* of the anti-dust cover 3 so as to pass through between the upper guide 4 and the guide portion 5*a* substantially at the middle, and through substantially the middle of the disk insertion hole 44*a*.

Furthermore, like the guide portion 5*a* of the roller base 5 described above, the upper surface of the lid 2 is gently curved into a concave shape, as shown in FIG. 9B. Accordingly, when inserting the disk 200 into the disk insertion opening 1*c* with the upper surface of the lid 2 as a guide, only the peripheral part of the disk 200 brings into contact with the upper surface of the lid 2, and other parts are allowed to not bring into contact with the lid 2. Therefore, the disk 200 can be prevented from being scratched.

Furthermore, a shaft hole 44*b* is formed to the chassis member 44, and also, a bearing portion 44*c* for slidably retaining the connecting rod 41 is formed to the chassis member 44, as shown in FIG. 6. The bearing portion 44*c* includes a guide portion 44*f*, and a vertical plate portion of the connecting rod 41 is slidably fitted to the guide portion 44*f*. A lid opening/closing gear block 150 (refer to FIG. 5) formed from a lid opening/closing gear 45, a lid opening/closing arm 46, and torsion coil spring 47 is attached to the shaft hole 44*b* formed on the upper portion of the bearing portion 44*c* by a lock washer 48 and a gear shaft 49. More specifically, the gear shaft 49 is inserted and fixed to the shaft hole 44*b*, and passes through the torsion coil spring 47, the lid opening/closing arm 46, and the lid opening/closing gear 45, and the lock washer 48 is fixed to its tip. The torsion coil spring 47, the lid opening/closing arm 46, and the lid opening/closing gear 45 are positioned between the bearing portion 44*c* and the lock washer 48, are retained so as not to fall from the gear shaft 49 by having the lock washer 48 fixed to the tip of the gear shaft 49, and are made rotatable.

Furthermore, as shown in FIGS. 7A and 7B, a toggle sprint 50 is provided at a lower part of the lid 2 and between the side plate portion 2*d* of the lid 2 and the bearing plate 43*a* of the frame 43. One end portion 50*a* of the toggle spring 50 is supported by a hole 43*c* formed to the bearing plate 43*a*. The other end portion 50*b* of the toggle spring 50 is supported by a hole 2*e* formed to the side plate portion 2*d*. When the lid 2 rotates about the rotation shaft 2*b*, the toggle spring 50 rotates with the one end portion 50*a* serving as a fulcrum point and the other end portion 50*b* serving as a point of action.

Also, an arm 2*f* is formed on the bottom surface of the lid 2, in front of the rotation shaft 2*b* (on the right side in FIGS. 7A and 7B). The arm 2*f* is configured to be able to bring into contact with an operation lever 51*a* of a lid opening/closing detection switch 51 provided to the bottom wall 1*e* of the outer case 1. When the lid 2 moves from the closed lid position 2A to the open lid position 2B, the arm 2*f* brings into contact with the operation lever 51a, and the lid opening/closing detection switch 51 is turned on. On the other hand, when the lid 2 moves from the open lid position 2B to the closed lid position 2A, the arm 2f is separated from the operation lever 51a, and the lid opening/closing detection switch 51 is turned off. The position of the lid 2 can be detected by detecting on/off of the lid opening/closing detection switch 51.

Furthermore, engagement portions 2g, 2g are provided at both sides at the end of the lid 2 on the disk drive unit 100 side. The engagement portions 2g, 2g are formed so as to engage with regulating portions 44d, 44d formed at both sides of the chassis member 44 when the lid 2 is positioned in the closed lid position 2A. The lid 2 is retained in the closed lid position 2A by the engagement portions 2g and the regulating portions 44d being engaged.

Furthermore, as shown in FIGS. 5 and 6, a housing 44e is formed to the chassis member 44. A shock absorber 52 is accommodated in the housing 44e. The shock absorber 52 is provided so that its upper portion 52a brings into contact with the bottom surface of the lid 2 when the lid 2 is positioned in the open lid position 2B. According to this configuration, the impact noise occurring at the time of the lid 2 moving from the closed lid position 2A to the open lid position 2B is reduced. Also, as shown in FIGS. 7A and 7B, a housing 44g is formed to the regulating portion 44d of the chassis member 44 described above. A shock absorber 44h is arranged in this housing 44g. According to this configuration, the impact noise occurring at the time of the lid 2 moving from the open lid position 2B to the closed lid position 2A is reduced.

Also, as shown in FIGS. 7A and 7B, the internal gear 2c of the lid 2 is configured to mesh with the lid opening/closing gear 45. When the lid 2 moves from the closed lid position 2A to the open lid position 2B, the lid opening/closing gear 45 is rotated via the internal gear 2c of the lid 2. On the other hand, when the lid 2 moves from the open lid position 2B to the closed lid position 2A, the lid 2 is rotated about the rotation shaft 2b by the rotation of the lid opening/closing gear 45.

As shown in FIG. 8A, a gear portion 45a, one gear end portion 45a-1, the other gear end portion 45a-2, a shaft hole 45b, an arm fitting shaft portion 45c, and a spring engagement portion 45d are formed to the lid opening/closing gear 45. Also, an arm portion 46a, a shaft hole 46b into which the arm fitting shaft portion 45c of the lid opening/closing gear 45 is fitted, and a spring engagement portion 46c are formed to the lid opening/closing arm 46. The torsion coil spring 47 is engaged in a state where predetermined (small) torque is applied on the spring engagement portion 45d of the lid opening/closing gear 45 and the spring engagement portion 46c of the lid opening/closing arm 46.

Normally, the lid opening/closing arm 46 is retained, with the arm portion 46a contacting the gear end portion 45a-1, by being biased in an arrow B5 direction in FIG. 8B by the biasing force of the torsion coil spring 47 with respect to the lid opening/closing gear 45. If a load greater than the biasing force of the torsion coil spring 47b is added in this retained state to the arm portion 46a of the lid opening/closing arm 46 in an arrow B6 direction opposite the arrow B5 direction, the arm portion 46a rotates relatively with respect to the lid opening/closing gear 45 in the arrow B6 direction, against the biasing force of the torsion coil spring 47, and as shown in FIG. 8B, the arm portion 46a is released from a state where it is brought into contact with the gear end portion 45a-1. At this time, the arm portion 46a may be rotated until it brings into contact with the gear end portion 45a-2.

Furthermore, as shown in FIG. 7A, when the end portion 50b, which is a point of action, is positioned above a straight line L1 passing through the rotation shaft 2b of the lid 2 and the end portion 50a, the toggle spring 50 biases the lid 2 in an arrow B1 direction (the closing direction). The lid 2 is retained in the closed lid position 2A by this biasing force of the toggle spring 50. In this state, the upper surface of the lid 2 is substantially flush with the surface of the front wall 1a. Also, as shown in FIG. 7B, when the end portion 50b, which is the point of action, is positioned below the straight line L1, the toggle spring 50 biases the lid 2 in an arrow B2 direction (the opening direction). The lid 2 is retained in the open lid position 2B by this biasing force of the toggle spring 50. In this state, the disk insertion hole 44a formed to the chassis member 44 (that is, the disk insertion opening 1c) is exposed to the outside, and the disk 200 can be inserted into the disk drive unit 100. That is, the toggle spring 50 functions as a retaining mechanism for retaining a state where the lid 2 is positioned in the closed lid position 2A or the open lid position 2B by having the direction of action between the side plate portion 2d of the lid 2 and the bearing plate 43a of the frame 43 reversed in conjunction with the opening or closing of the lid 2.

The lid 2 may be moved from the open lid position 2B to the closed lid position 2A by pressing a part of the lid 2 away from the disk insertion hole 44a than the rotation shaft 2b in an arrow B3 direction with a finger against the biasing force of the toggle spring 50 in the arrow B2 direction. When the end portion 50b, which is a point of action, is moved above the straight line L1 by this pressing, the direction of action of the biasing force of the toggle spring 50 is reversed from the arrow B2 direction to the arrow B1 direction. The lid 2 is thereby retained in the closed lid position 2A, as shown in FIG. 7A.

Figure 10:
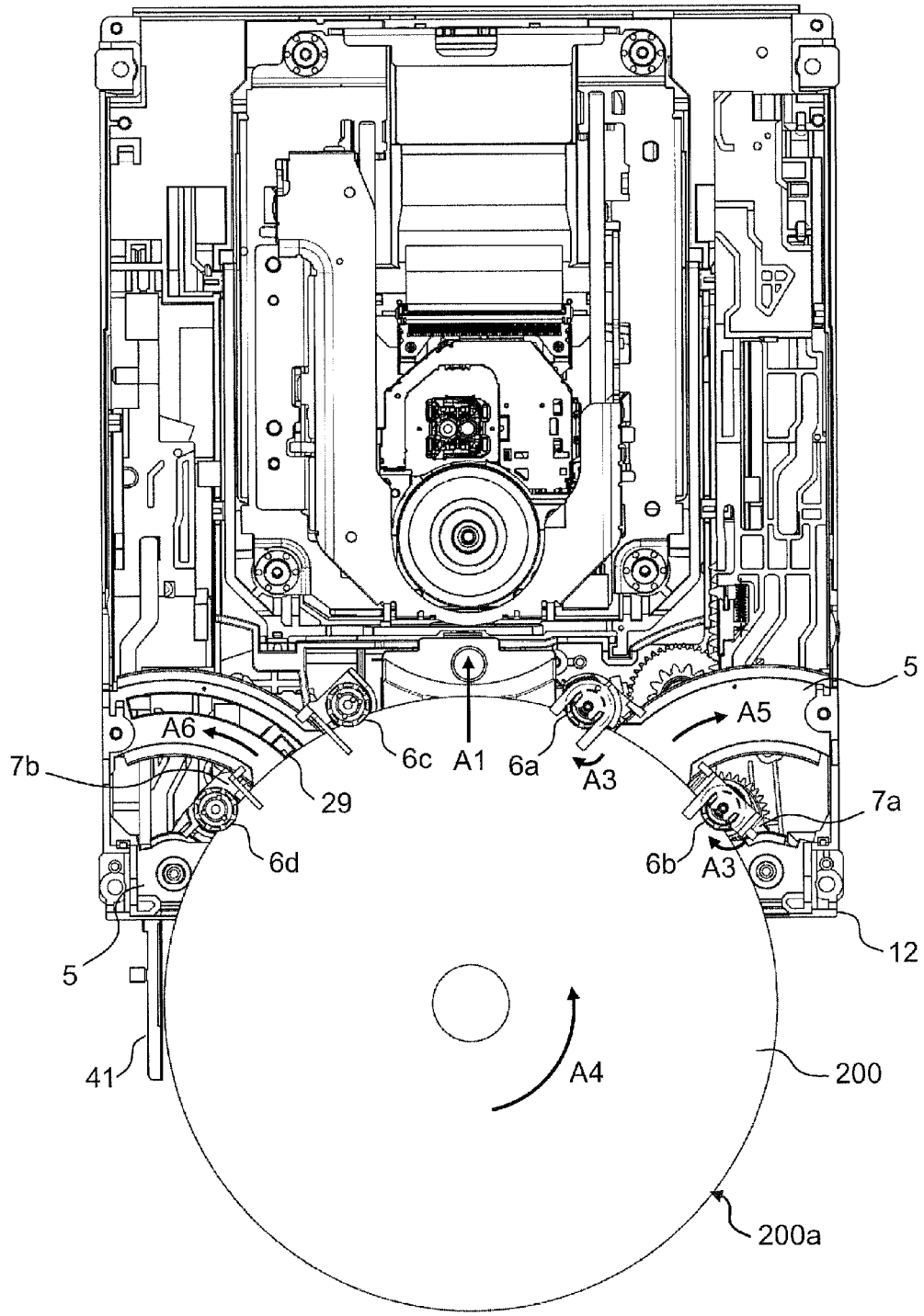
FIG. 10 is a top view showing a state immediately after a disk is inserted inside the disk drive unit shown in FIG. 2.
Figure 11:
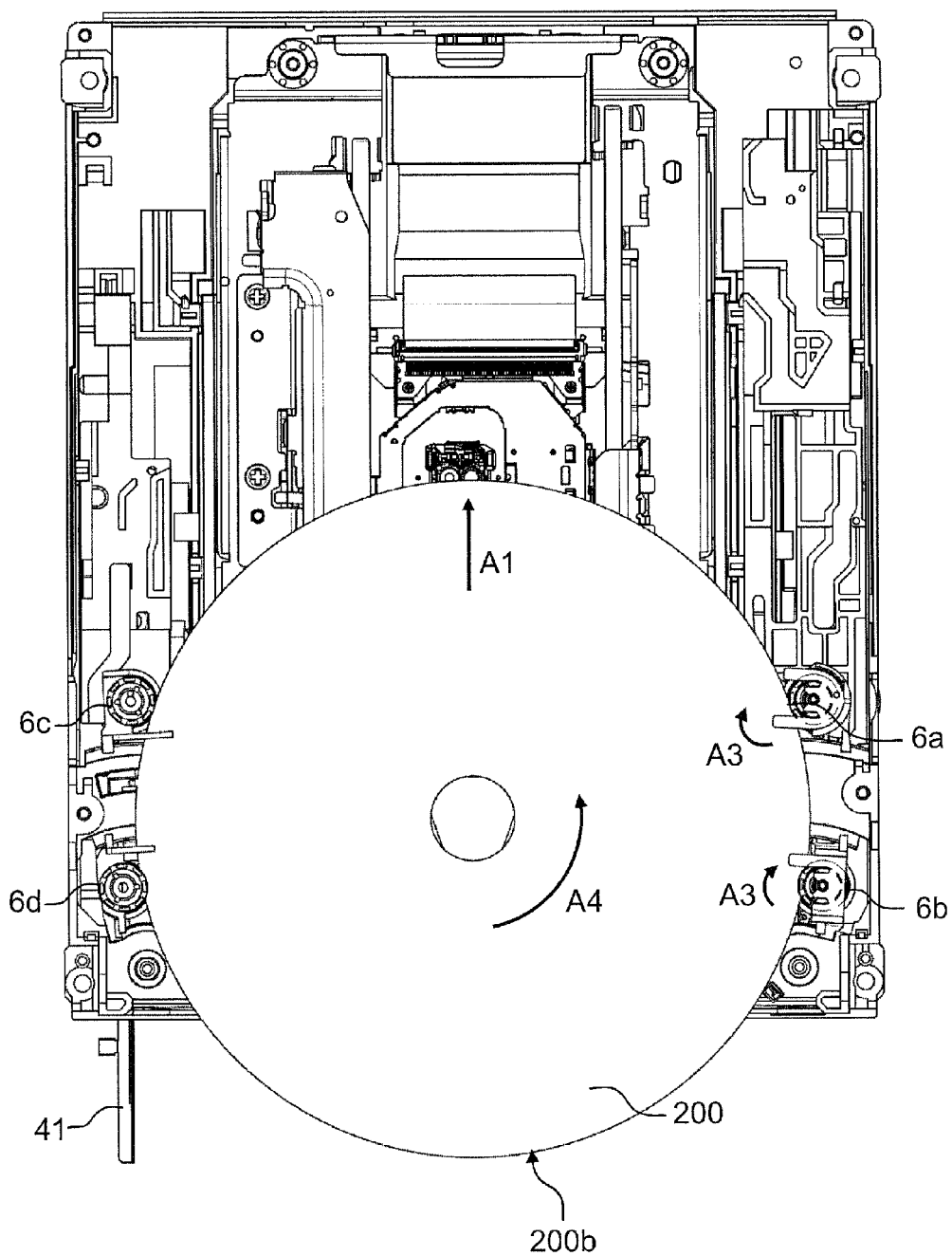
FIG. 11 is a top view showing a state where a disk is being conveyed into the inside of the disk drive unit shown in FIG. 2.
Figure 12:
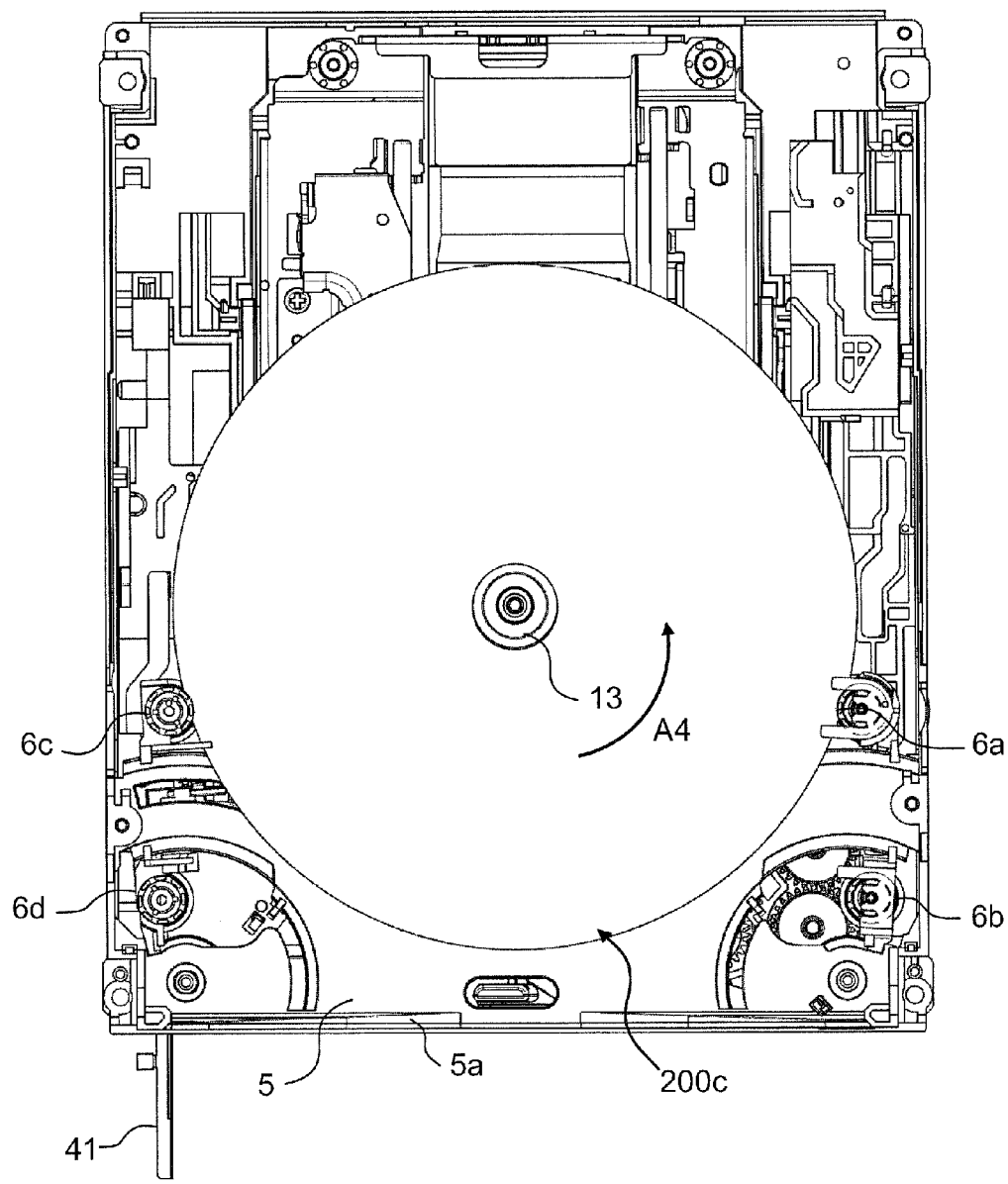
FIG. 12 is a top view showing a state where a disk has been conveyed to a replayable position inside the disk drive unit shown in FIG. 2.

Next described with reference to FIGS. 10 to 12 is a disk conveyance operation of conveying the disk 200 inserted into the casing 101 to the replayable position. FIGS. 10 to 12 are top views showing conveying states of the disk 200.

FIG. 10 shows a state immediately after the disk 200 is inserted into the casing 101. At this time, the disk 200 is brought into contacted with the pair of rubber rollers 6a, 6b on the right side and the pair of rubber rollers 6c, 6d on the left side. At this time, the disk detection lever 29 provided to the roller arm 7b is rotated by being pressed by the disk 200, so that the detection switch 27a is operated so as to detect that the disk 200 is inserted through the disk insertion opening 1c. When the detection switch 27a is operated, the motor 9 starts driving. The drive force of the motor 9 is transmitted to the rubber rollers 6a, 6b via the gear row 10 and the gear row 8. Thereby, the rubber rollers 6a, 6b are rotated in an arrow A3 direction, and by rotation drive force and friction force of the rubber roller 6b and friction force of the non-rotated rubber roller 6d facing the rubber roller 6b while sandwiching the disk 200, the disk 200 is rotated in an arrow A4 direction taking the rubber roller 6d (in more detail, an contact point with the disk 200) as a rotation center. By this rotation in the arrow A4 direction, the disk 200 is conveyed in the arrow A1 direction.

When the disk 200 is conveyed in the arrow A1 direction from the state shown in FIG. 10, the disk 200 extends a gap between the rubber roller 6b and the rubber roller 6d. Thereby, against bias force of the torsion coil springs 7a-2, 7b-2 described with reference to FIGS. 16A and 16B, the roller arm 7a is rotated in the arrow A5 direction, and the roller arm 7b is rotated in the arrow A6 direction. That is, the pair of roller arms 7a, 7b is rotated in the directions in which the roller arms are brought away from each other (opening directions). By the rotation of the roller arms 7a, 7b, the rubber rollers 6a, 6c are once brought away from a peripheral part of the disk 200. After that, when the disk 200 is further conveyed in the arrow A1 direction and a center part of the disk 200 having the maximum diameter in the left and right direction of the disk 200 passes through the gap between the rubber rollers 6b, 6d, the roller arm 7a is rotated in the arrow A7 direction, and the roller arm 7b is rotated in the arrow A8 direction by the bias force of the torsion coil springs 7a-2, 7b-2 described with reference to FIGS. 16A and 16B. That is, the pair of roller arms 7a, 7b is rotated in the directions in which the roller arms are brought close to each other (closing directions). Thereby, the rubber rollers 6a, 6c are brought into contact with the peripheral part of the disk 200 again and brought into the state shown in FIG. 11.

FIG. 11 shows a state where all the rubber rollers 6a to 6d are brought into contact with the disk 200, and when the disk 200 is further conveyed from this state in the arrow A1 direction, a state as shown in FIG. 12 where the disk 200 is conveyed to the replayable position is obtained. The disk 200 passes through a disk position 200b shown in FIG. 11 in a process of conveyance from a disk position 200a immediately after insertion into the casing 101 (refer to FIG. 10) to a disk position 200c serving as the replayable position (refer to FIG. 12). At this disk position 200b, rotation force for the disk 200 is switched to be transmitted from the rubber rollers 6a, 6c instead of the rubber rollers 6b, 6d. That is, from this disk position 200b to the disk position 200c, the disk 200 is rotated in the arrow A4 direction taking the rubber roller 6c as a rotation center by rotation drive force of the rubber roller 6a. By this rotation in the arrow A4 direction taking the rubber roller 6c as the rotation center, the disk 200 is further conveyed in the arrow A1 direction. The disk 200 is conveyed to the disk position 200c shown in FIG. 12. At this position, the conveyance operation of the disk 200 is finished.

When the disk 200 is conveyed to the position shown in FIG. 12, that is, a position facing the turntable 13 where the disk can be reproduced, a conveyance complete position of the disk 200, that is, the disk position 200c described above is detected by the trigger lever 25. At this disk position 200c shown in FIG. 12, transmission of the drive force of the motor 9 is switched from driving of conveyance of the disk 200 to driving of the slide cam members 16, 18 by the action of the trigger lever 25, and a clamping operation for disk installation is performed. The states of switching by the trigger lever 25 are shown in FIGS. 13 and 14.

Next, the operation of the guide lever 26, the centering member 24, the trigger lever 25, and the slide cam member 16 at the time of switching from a disk conveyance operation to a disk installation operation will be described with reference to FIGS. 13 and 14. FIGS. 13 and 14 are top views showing positional relationships of the guide lever 26, the centering member 24, the trigger lever 25, and the slide cam member 16 at the time of disk conveyance operation. It is noted that in these figures, part of the parts is transparently shown for convenience.

When the disk 200 is inserted through the disk insertion opening 1c and is conveyed in the arrow A1 direction, first, a tip, and its periphery, of the disk 200 bring into contact with a positioning guide 26b of the guide lever 26, and the disk 200 is positioned with respect to height in the thickness direction. When the disk 200 is further conveyed in this state in the arrow A1 direction, the guide lever 26 is rotated by the disk 200 with the rotation shaft 26a as the center. Then, the disk 200 brings into contact with positioning contact portions 24a, 24b of the centering member 24, and is positioned by the centering member 24 in the left and right direction (that is, centering is performed). When the disk 200 is further conveyed in this state in the arrow A1 direction, the centering member 24 is moved in the arrow A1 direction by the disk 200. By this movement of the centering member 24, the trigger lever 25 whose rotation shaft portion 25c is engaged with a guide cam 24e provided to the centering member 24 has the rotation shaft portion 25c guided from a first straight portion 24e-1 of the guide cam 24e to a sloping cam portion 24e-2 and to a second straight portion 24e-3, and when it is guided to the sloping cam portion 24e-2, the trigger lever 25 moves toward the slide cam member 16 in its entirety. Additionally, the rotation shaft portion 25c of the trigger lever 25 is provided so that it does not move in the arrow A1 or A2 direction. Engagement between a slide cam pressing portion 25b of the trigger lever 25 and a first engagement portion 16b of the slide cam member 16 is released by this movement of the trigger lever 25. When the disk 200 is further conveyed in the arrow A1 direction from this state, the disk 200 is brought into contact with the disk contact portion 25a of the trigger lever 25 so as to press the trigger lever 25. The trigger lever 25 thereby rotates in an arrow A10 direction about the rotation shaft portion 25c, and falls into the state shown in FIG. 13. At this time, the slide cam pressing portion 25b of the trigger lever 25 brings into contact with a second engagement portion 16c of the slide cam member 16. This state is a state where the trigger lever 25 has detected that the disk 200 which was being conveyed was conveyed to the replayable position, but at this time, the rack 30 of the slide cam member 16 and the pinion 10g is not yet meshed.

Figure 13:
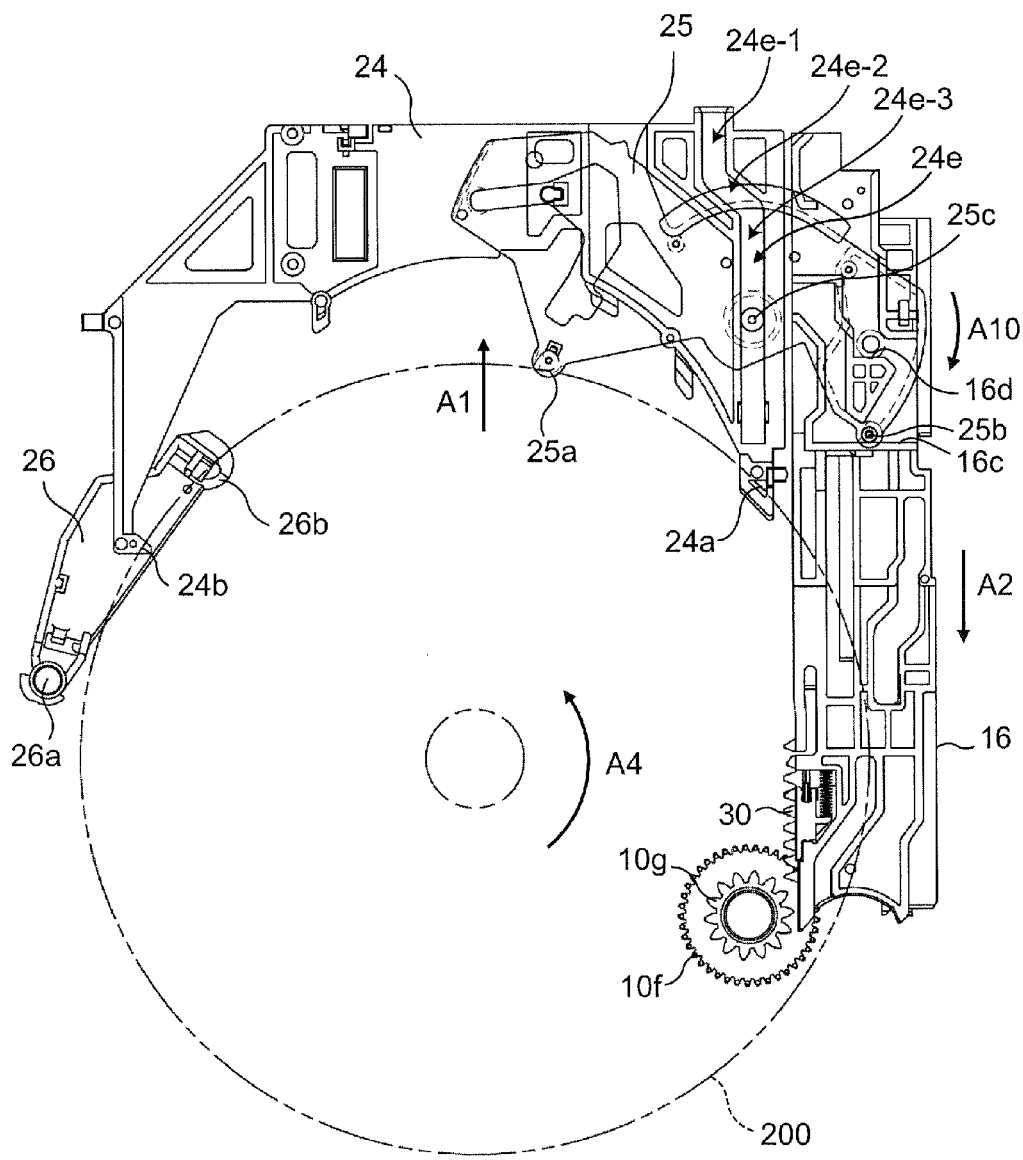
FIG. 13 is a top view showing a positional relationship of a guide lever, a centering member, a trigger lever, and the slide cam member at the time of loading of a disk.
Figure 14:
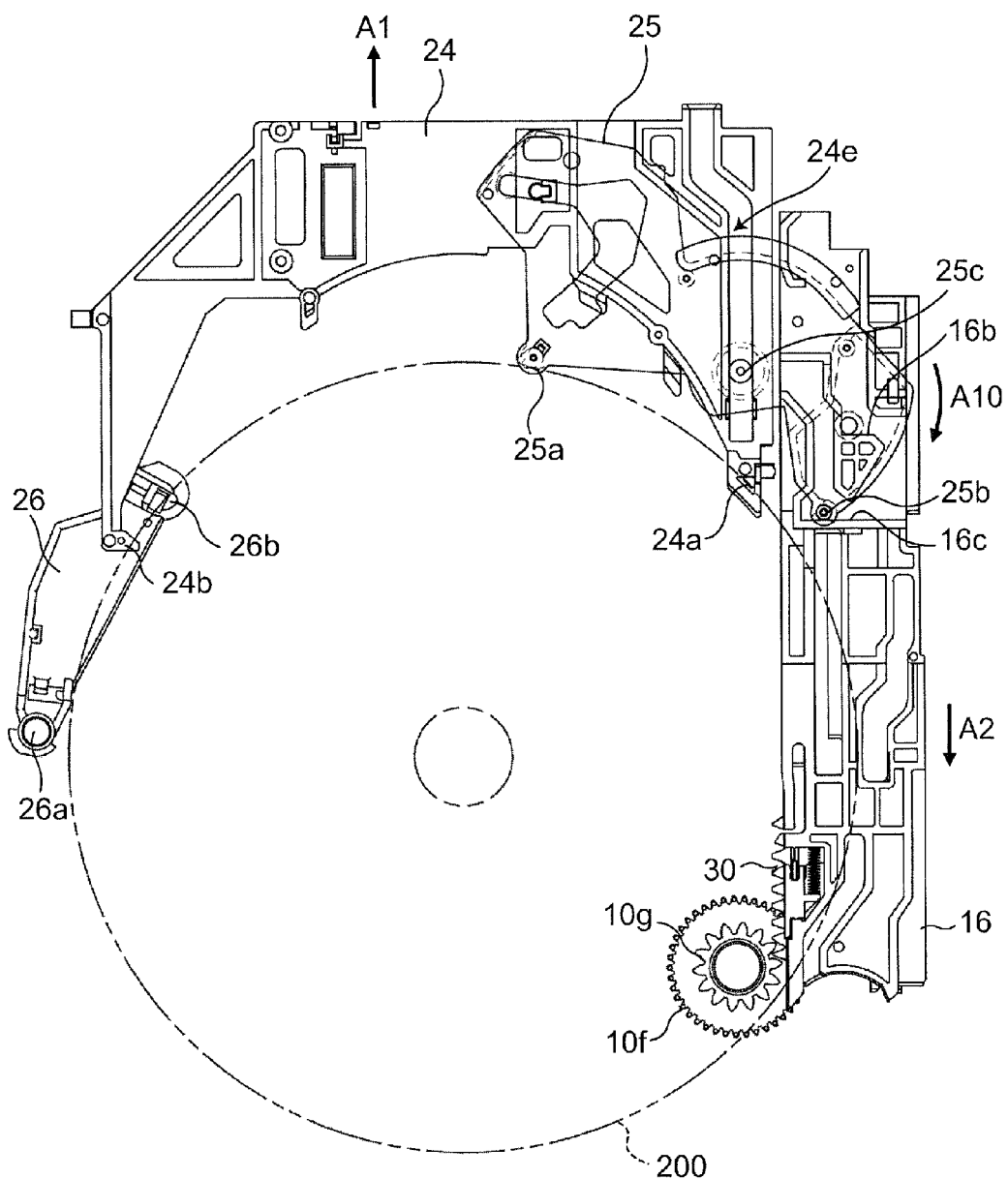
FIG. 14 is a top view showing a state where a disk has been further loaded from the state shown in FIG. 13.

When the disk 200 is further conveyed from the state shown in FIG. 13 in the arrow A1 direction, the trigger lever 25 whose disk contact portion 25a is pressed by the disk 200 is further rotated in the arrow A10 direction about the rotation shaft portion 25c. The slide cam pressing portion 25b of the trigger lever 25 then presses the second engagement portion 16c of the slide cam member 16, and the slide cam member 16 slightly slides in the arrow A2 direction. The rack 30 of the slide cam member 16 thereby meshes with the pinion 10g, as shown in FIG. 14, and the slide cam member 16 is directly driven by the drive force of the motor 9. That is, the conveyance operation of the disk 200 is completed, and the disk installation operation is started.

In the state shown in FIG. 14, the disk 200 is already conveyed to the replayable position. In the state shown in FIG. 14, the drive force of the motor 9 is transmitted to the pinion 10g, and the pinion 10g is rotated. Therefore, the rack 30 meshed with the pinion 10g is driven, and the slide cam member 16 further slides in the arrow A2 direction. In accordance with this sliding, the slide cam member 18 connected to the slide cam member 16 via the link arm 17 slides in the arrow A1 direction. By this sliding of the slide cam members 16, 18 in the opposite directions to each other, as described above, the installment operation of the disk 200 onto the turntable 13 is performed.

Additionally, in the process of switching from the conveyance operation of the disk 200 to the installment operation, a portion of the trigger lever 25 which brings into contact with the disk 200, such as the disk contact portion 25a, is separated from the disk 200 in conjunction with the movement of the slide cam members 16, 18. Accordingly, there is no problem regarding the installation operation of the disk 200.

Next, an ejection operation of the disk 200 will be described. To eject the disk 200, first, the clamping state of the disk 200 which is in a replayable state has to be released and then a lowering operation of the traverse 15 has to be performed such that the disk 200 is in a state where conveyance is allowed. This description is omitted, and a description is given here assuming that the disk 200 is positioned at the disk position 200c shown in FIG. 12, the clamping state is released, and the disk 200 is nipped by the rubber rollers 6a, 6c.

Firstly, the motor 9 is already reversely driven for canceling the clamping state, and the rubber rollers 6a, 6b are rotated in the opposite direction to that of the conveyance operation of the disk 200. Thereby, the disk 200 is rotated in the opposite direction to the arrow A4 direction taking the rubber roller 6c as the rotation center. By this rotation in the opposite direction to the arrow A4 direction, the disk 200 is conveyed in the opposite direction to the arrow A1 direction (that is, the arrow A2 direction).

When the disk 200 reaches the disk position 200b shown in FIG. 11 by the conveyance in the opposite direction to the arrow A1 direction, the rotation force of the disk 200 is switched to be transmitted from the rubber rollers 6b, 6d instead of the rubber rollers 6a, 6c. Thereby, the disk 200 is rotated in the opposite direction to the arrow A4 direction taking the rubber roller 6d as the rotation center. By this rotation in the opposite direction to the arrow A4 direction, the disk 200 is further conveyed in the opposite direction to the arrow A1 direction. When the detection switch 27b detects that the disk 200 is conveyed to the disk position 200a shown in FIG. 10 by this conveyance in the opposite direction to the arrow A1 direction, the motor 9 stops driving. Thereby, the ejection operation of the disk 200 is completed.

It is noted that the disk 200 ejected to the disk position 200a shown in FIG. 10 can be taken out by fingers of a user. At this time, with nipping force and friction force of the rubber rollers 6a to 6d as well as elastic force and friction force of the anti-dust cover 3, the disk 200 is retained without popping out from the opening portion 1a to the exterior of the casing 101.

Next, with reference to FIGS. 17A to 20, a configuration for raising and lowering the turntable 13 will be described in more detail.

Figure 17A:
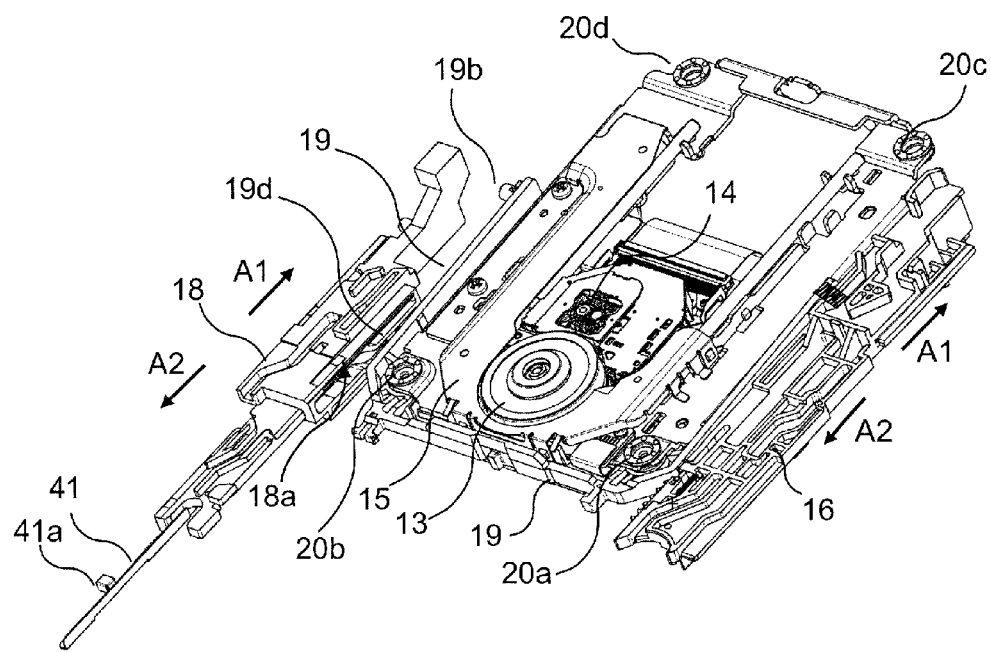
FIG. 17A is a perspective view showing a positional relationship between an intermediate chassis and a pair of slide cam members when a turntable is lowered.
Figure 17B:
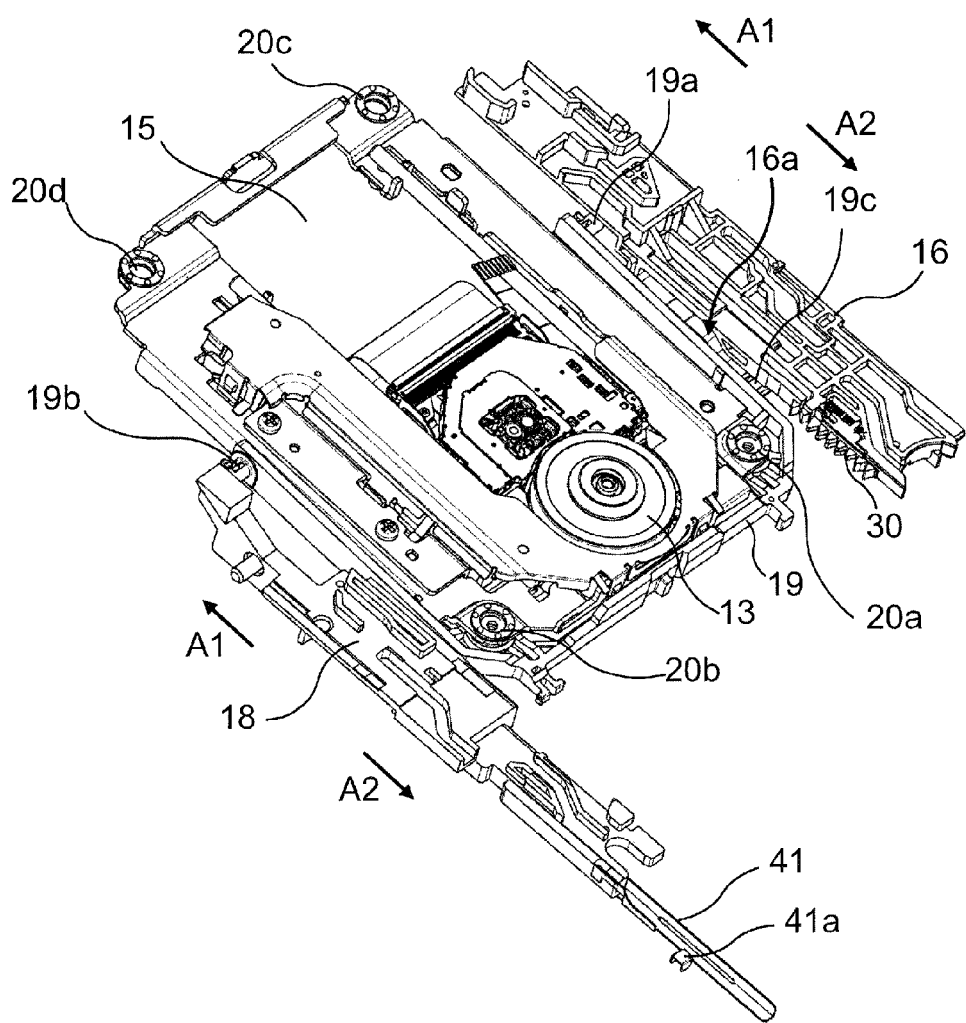
FIG. 17B is a perspective view showing, from a different angle from FIG. 17A, a positional relationship of the intermediate chassis and the pair of slide cam members when the turntable is lowered.
Figure 18:
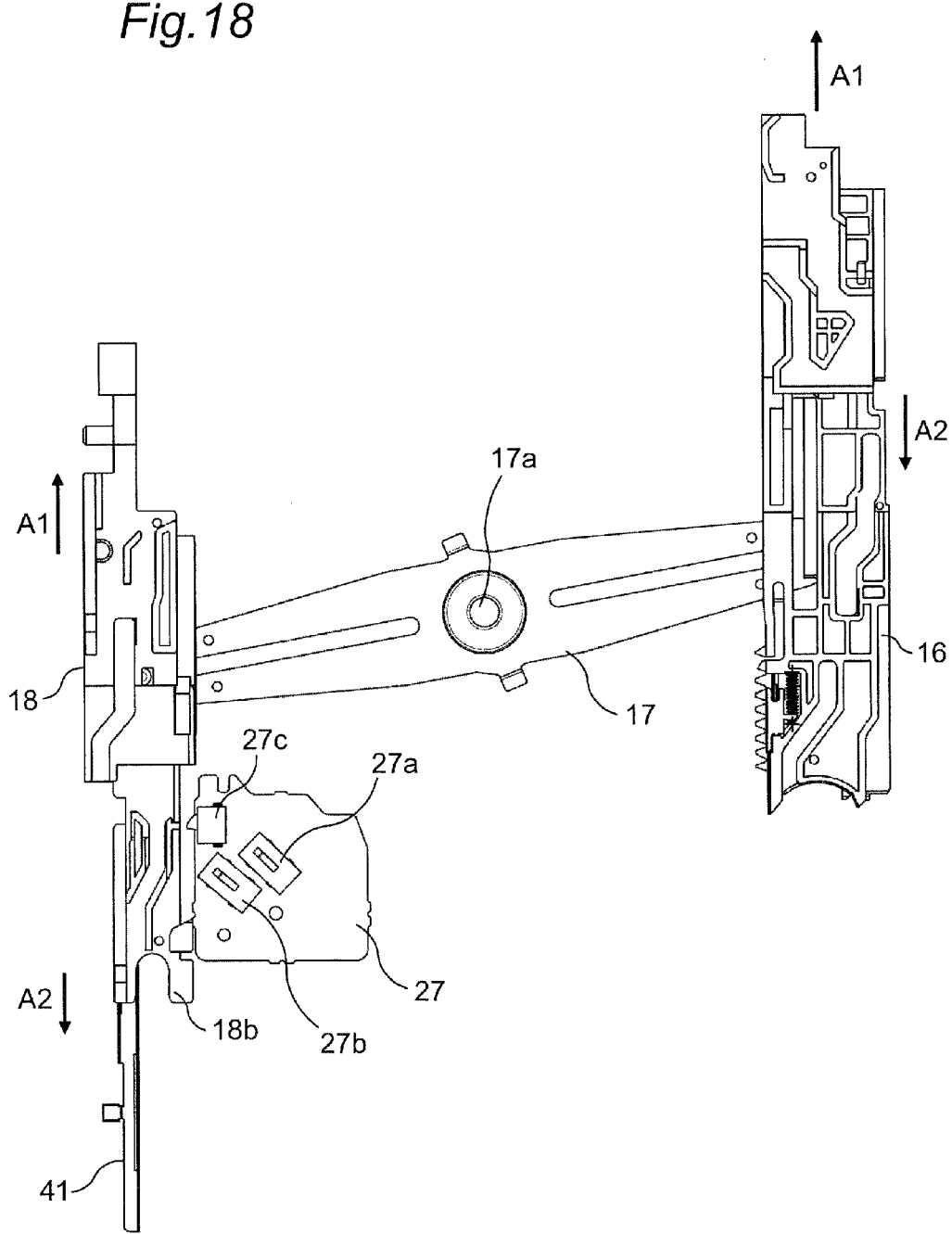
FIG. 18 is a top view showing a positional relationship between the slide cam members and a link arm when the turntable is lowered.

FIGS. 17A and 17B are perspective views showing a positional relationship between the intermediate chassis 19 and the slide cam members 16, 18 when the turntable 13 is lowered (standby state that the disk 200 is not inserted). FIG. 18 is a top view showing a positional relationship between the slide cam members 16, 18 and the link arm 17 when the turntable 13 is lowered. In this state, the slide cam member 16 is biased in the A1 direction by the spring 16j as described above with reference to FIG. 3. This slide cam member 16 is coupled to the slide cam member 18 via the link arm 17. The link arm 17 is provided rotatably about a rotation shaft 17a. Therefore, the slide cam member 18 is biased by the spring 16j in the arrow A2 direction opposite to that of the slide cam member 16. Accordingly, the connecting rod 41 connected to the slide cam member 18 is also biased in the arrow A2 direction. The connecting rod 41 is thereby retained in a state of protruding forward through the cutout portion 42 formed to the casing 101 of the disk drive unit 100, as shown in FIG. 5.

As shown in FIG. 18, a protruding portion 18b capable of being brought into contact with the detection switch 27c is formed to the slide cam member 18. When the disk 200 is conveyed to the replayable position and the slide cam member 18 slides in the arrow A1 direction, the protruding portion 18b is brought into contact with the detection switch 27c so as to operate the detection switch 27c.

It is noted that as described above, the state shown in FIGS. 17A, 17B, and 18 is continued until the disk 200 is conveyed to the replayable position, the slide cam member 16 is pressed by the slide cam pressing portion 25b of the trigger lever 25, the rack 30 is meshed with the pinion 10g, and then the slide cam member 16 starts sliding in the arrow A2 direction. The slide cam member 16 slides in the arrow A2 direction and the slide cam member 18 slides in the arrow A1 direction, so that the engagement pins 19c, 19d of the intermediate chassis 19 move along the raising and lowering cam 16a and the raising and lowering cam 18a. Thereby, the front part of the intermediate chassis 19 is raised, the turntable 13 is raised, and the disk 200 is nipped between the turntable 13 and the damper 21. After that, the protruding portion 18b of the slide cam member 18 described above is brought into contact with the detection switch 27c, so that the drive of the motor 9 is stopped. The disk 200 thereby falls into an installation completion state, and the state shown in FIGS. 19A, 19B, and 20 is obtained.

Figure 19A:
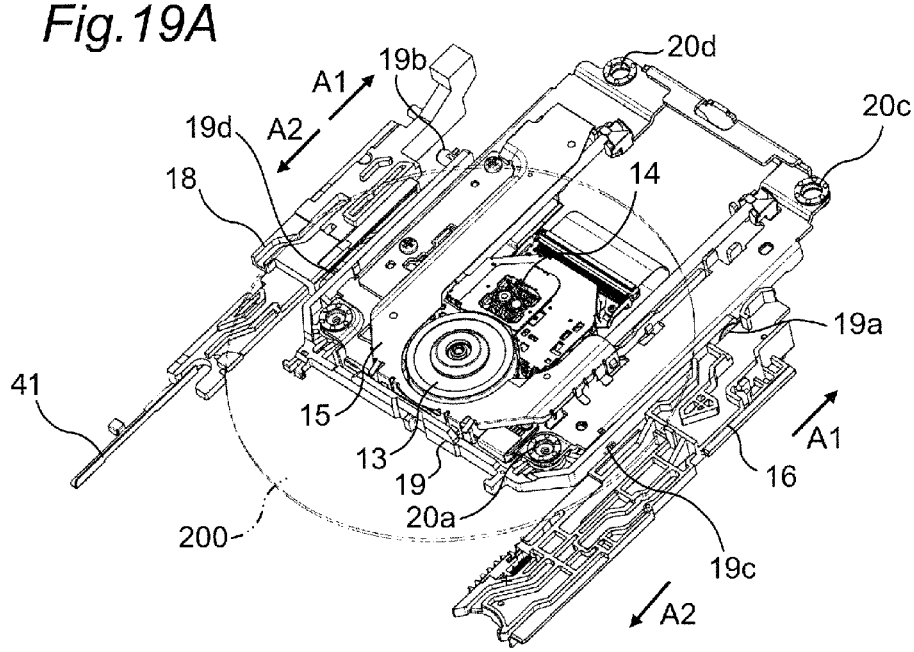
FIG. 19A is a perspective view showing a positional relationship between the intermediate chassis and the pair of slide cam members when the turntable is raised.
Figure 19B:
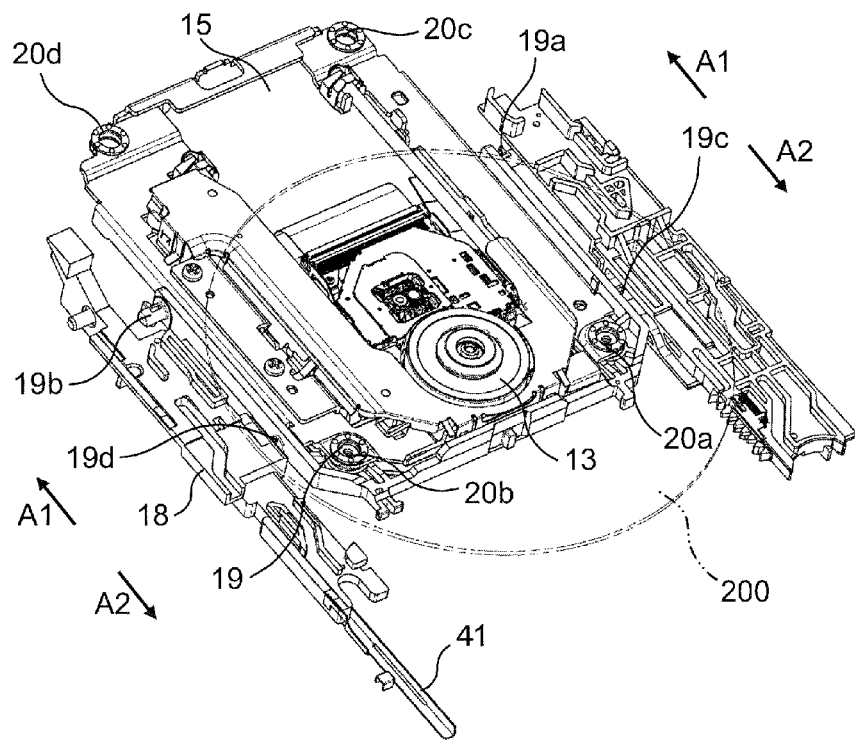
FIG. 19B is a perspective view showing, from a different angle from FIG. 19A, a positional relationship of the intermediate chassis and the pair of slide cam members when the turntable is raised.
Figure 20:
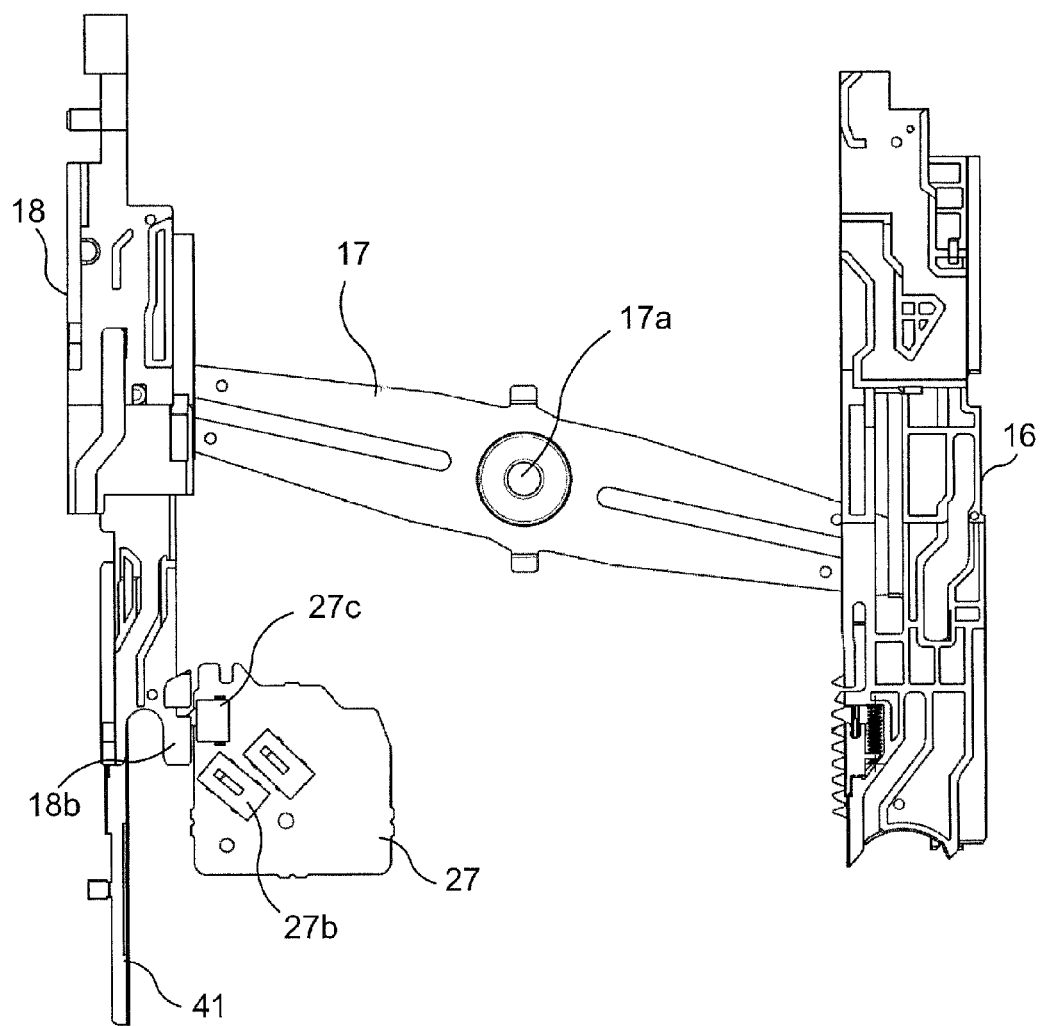
FIG. 20 is a top view showing a positional relationship between the slide cam members and the link arm when the turntable is raised.

FIGS. 19A and 19B are perspective views showing a positional relationship between the intermediate chassis 19 and the slide cam members 16, 18 when the turntable 13 is raised (installment completion state of the disk 200). FIG. 20 is a top view showing a positional relationship among the slide cam member 16, the slide cam member 18, and the link arm 17 when the turntable 13 is raised. It is noted that at this time, the rack 30 and pinion 10g remain being meshed with each other. In this state, the connecting rod 41 is retained against the biasing force of a spring 16j (refer to FIG. 3) by the meshing between the rack 30 and the pinion 10g. Therefore, the connecting rod 41 is positioned in a position where the amount of protrusion to the front of the disk drive unit 100 is the smallest. Furthermore, this state is continued until the motor 9 is reversely driven for the ejection of the disk 200 and the rack 30 is driven via the pinion 10g, and the slide cam member 16 starts sliding in the arrow A1 direction, which is an opposite direction from the time of installation of the disk 200.

Next, a relationship between an opening/closing operation of the lid 2 and the movement of the connecting rod 41 will be described with reference to FIGS. 21A to 24B.

Figure 21A:
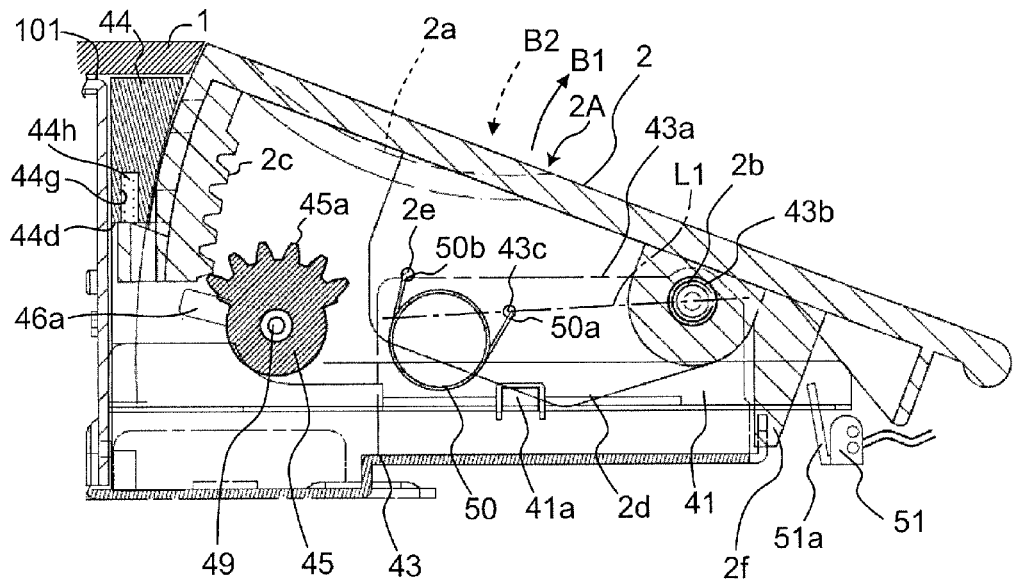
FIG. 21A is a sectional view showing a positional relationship of parts related to the lid where a disk is not installed on the turntable and the lid is positioned in the closed lid position.

FIG. 21A shows a positional relationship of parts related to the lid 2 where the lid 2 is positioned in the closed lid position 2A. In the state shown in FIG. 21A, the disk 200 is not installed on the turntable 13. The lid 2 is biased by the toggle spring 50 in the arrow B1 direction, and is retained in the closed lid position 2A. The operation lever 51a and the arm 2f are not brought into contact with each other, and the lid opening/closing detection switch 51 is in an off state. The connecting rod 41 is positioned so as to protrude farthest to the front of the disk drive unit 100. The protruding portion 41a is positioned to the front of the disk drive unit 100 (on the rotation shaft 2b side) than the lid opening/closing gear 45.

When the concave portion 2a of the lid 2 is pressed in the arrow B2 direction in the state shown in FIG. 21A, the lid 2 rotates in the arrow B2 direction about the rotation shaft 2b. The internal gear 2c provided to the lid 2 thereby meshes with the gear portion 45a of the lid opening/closing gear 45, and the lid opening/closing gear 45 rotates about the gear shaft 49. Also, the end portion 50b of the toggle spring 50 supported by the side plate portion 2d of the lid 2 moves downward in accordance with the rotation of the lid 2 in the arrow B2 direction. The direction of bias on the lid 2 by the toggle spring 50 is thereby reversed at the timing of the end portion 50b of the toggle spring 50 falling below the straight line L1 passing through the rotation shaft 2b and the end portion 50a. That is, the lid 2 is biased by the toggle spring 50 in the direction opposite the arrow B1 direction. The lid 2 is retained in the open lid position 2B shown in FIG. 21B by this biasing force of the toggle spring 50.

Figure 21B:
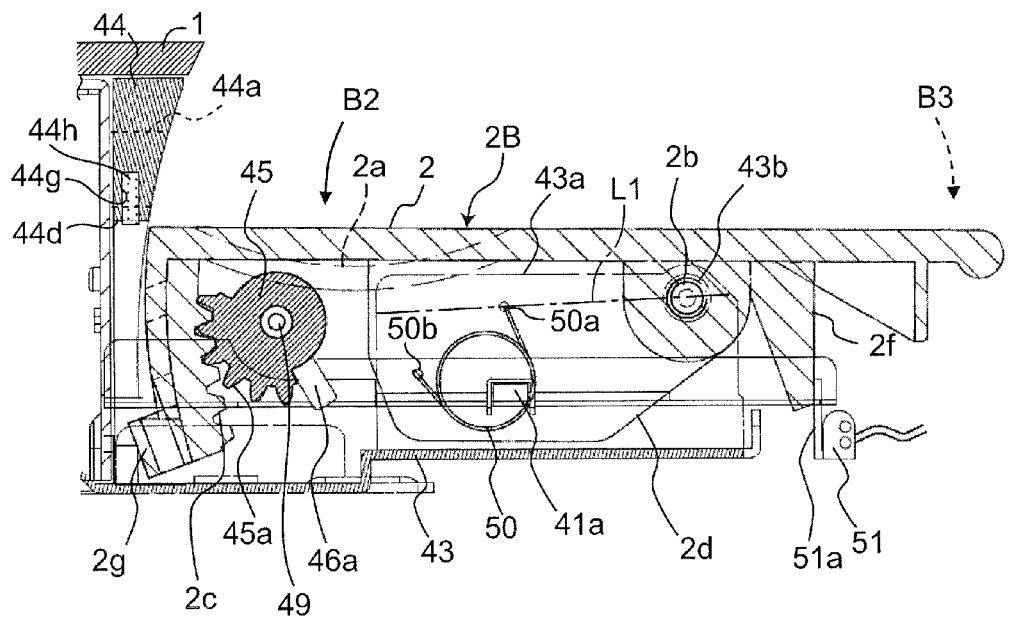
FIG. 21B is a sectional view showing a positional relationship of parts related to the lid where a disk is not installed on the turntable and the lid is positioned in the open lid position.

FIG. 21B shows a positional relationship of parts related to the lid 2 where the lid 2 is positioned in the open lid position 2B. During the shift from the state shown in FIG. 21A to the state shown in FIG. 21B, the lid 2 is brought into contact with the shock absorber 52 described above (refer to FIG. 5). The impact noise is thereby reduced.

In the state shown in FIG. 21B, the arm portion 46a of the lid opening/closing arm 46 fitted into the lid opening/closing gear 45 is positioned in the movement trajectory of the protruding portion 41a of the connecting rod 41. The operation lever 51a and the arm 2f are brought into contact with each other, and the lid opening/closing detection switch 51 is in an on state. The disk insertion hole 44a is exposed to the outside, and is in a state allowing insertion of the disk 200.

Figure 22A:
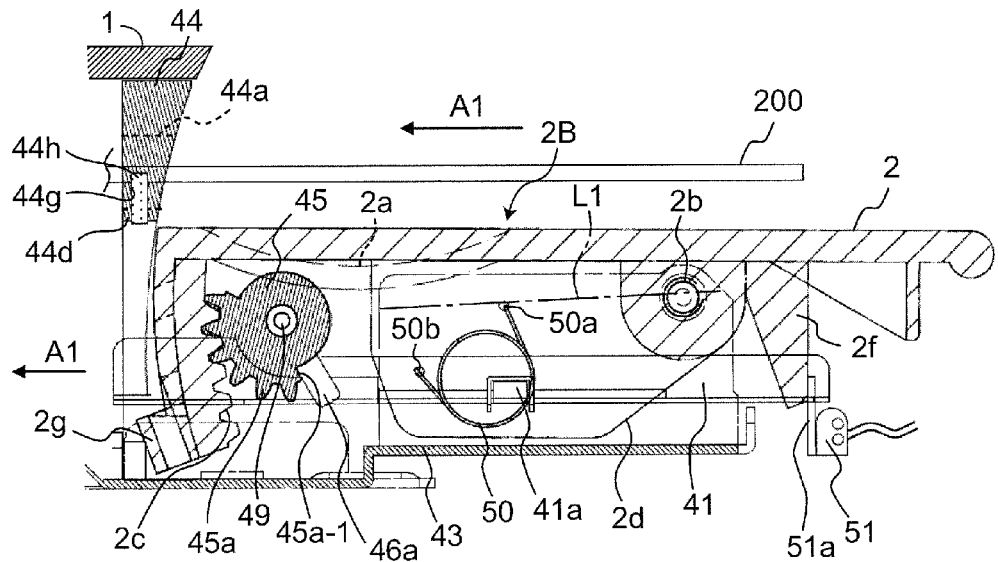
FIG. 22A is a sectional view showing a state where a disk is inserted into a disk insertion portion in a state where the lid is positioned in the open lid position.

FIG. 22A shows a state where the disk 200 is inserted into the disk insertion portion 44a in a state where the lid 2 is positioned in the open lid position 2B. The state shown in FIG. 22A corresponds to the state shown in FIG. 10 described above. In the state shown in FIG. 22A, the disk 200 is supported by the rubber rollers 6a to 6d and the elastic sheet 3a forming the anti-dust cover 3 described above, and is in a non-contact state with the upper surface of the lid 2. When the detection switch 27a detects that the disk 200 has been inserted into the disk drive unit 100 through the disk insertion hole 44a, the motor 9 is driven. The operation of conveying the disk 200 in the arrow A1 direction is thereby performed.

When the disk 200 is conveyed to the replayable position, the drive force of the motor 9 is transmitted to the disk installation mechanism instead of the disk conveyance mechanism. The connecting rod 41 provided to the slide cam member 18 thereby moves in the arrow A1 direction. The protruding portion 41a brings into contact with the arm portion 46a of the lid opening/closing arm 46 contacting the other end portion 45a-1 of the gear portion 45a of the lid opening/closing gear 45 in the process of movement of the connecting rod 41.

Figure 22B:
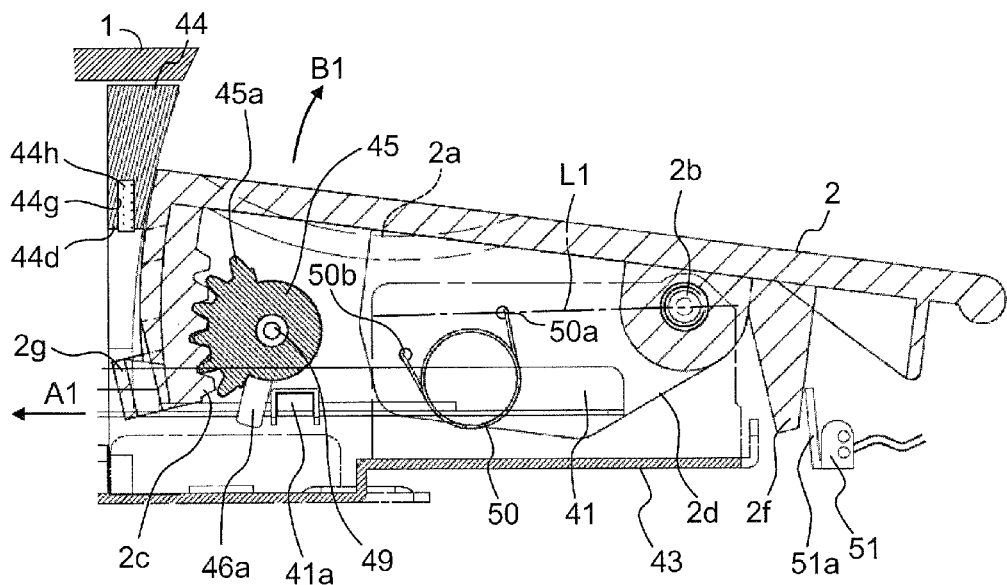
FIG. 22B is a sectional view showing a state where a protruding portion of the connecting rod is brought into contact with an arm portion of a lid opening/closing arm and a lid opening/closing gear is being rotated together with the arm portion.

FIG. 22B shows a state where the protruding portion 41a of the connecting rod 41 is brought into contact with the arm portion 46a of the lid opening/closing arm 46, and the lid opening/closing gear 45 is being rotated together with the arm portion 46a. The lid 2 meshed with the gear portion 45a of the lid opening/closing gear 45 by the internal gear 2c is rotated in the arrow B1 direction by the rotation of the lid opening/closing gear 45.

When the connecting rod 41 is further moved in the arrow A1 direction from the state shown in FIG. 22B, the lid opening/closing gear 45 is further rotated, and the lid 2 is further rotated in the arrow B1 direction. The end portion 50b of the toggle spring 50 supported by the side plate portion 2d of the lid 2 moves above the straight line L1 by this rotation of the lid 2, and the direction of bias on the lid 2 by the toggle spring 50 is reversed. That is, the lid 2 is biased by the toggle spring 50 in the arrow B1 direction. Thus, the lid 2 is further rotated in the arrow B1 direction. When the engagement portion 2g of the lid 2 brings into contact with the shock absorber 44h provided to the regulating portion 44d, the lid 2 falls into a state shown in FIG. 23A where it is retained in the closed lid position 2A. At this time, the impact noise is reduced by the shock absorber 44h. Additionally, the range of rotation of the lid opening/closing gear 45 by the contact of the protruding portion 41a against the arm portion 46a has to be set such that the lid 2 can be rotated at least until the end portion 50b of the toggle spring 50 has moved above the straight line L1

Figure 23A:
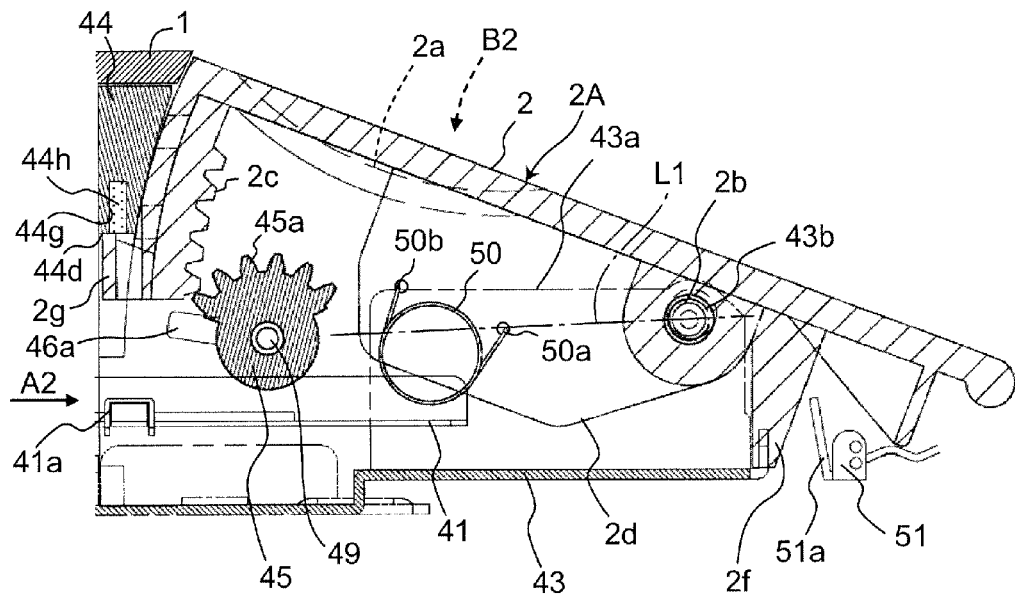
FIG. 23A is a sectional view showing a state of parts related to the lid where a disk is installed on the turntable and the lid is positioned in the closed lid position.

FIG. 23A shows a state where the lid 2 is retained in the closed lid position 2A. The closed lid state shown in FIG. 23A is different from the closed lid state shown in FIG. 21A in that the connecting rod 41 is moved in the arrow A1 direction, and the protruding portion 41a is positioned to the side of the disk drive unit 100 than the lid opening/closing gear 45. The disk 200 is installed on the turntable 13 of the disk drive unit 100 in the state shown in FIG. 23A.

When the concave portion 2a of the lid 2 is pressed in the arrow B2 direction in the state shown in FIG. 23A, the lid 2 rotates in the arrow B2 direction about the rotation shaft 2b. The internal gear 2c provided to the lid 2 thereby meshes with the gear portion 45a of the lid opening/closing gear 45, and the lid opening/closing gear 45 rotates about the gear shaft 49. Also, the end portion 50b of the toggle spring 50 supported by the side plate portion 2d of the lid 2 moves downward in accordance with the rotation of the lid 2 in the arrow B2 direction. The direction of bias on the lid 2 by the toggle spring 50 is thereby reversed at the timing of the end portion 50b falling below the straight line L1. That is, the lid 2 is biased by the toggle spring 50 in the arrow B2 direction. The lid 2 thereby falls into the state of FIG. 23B, and is retained in the open lid position 2B.

Figure 23B:
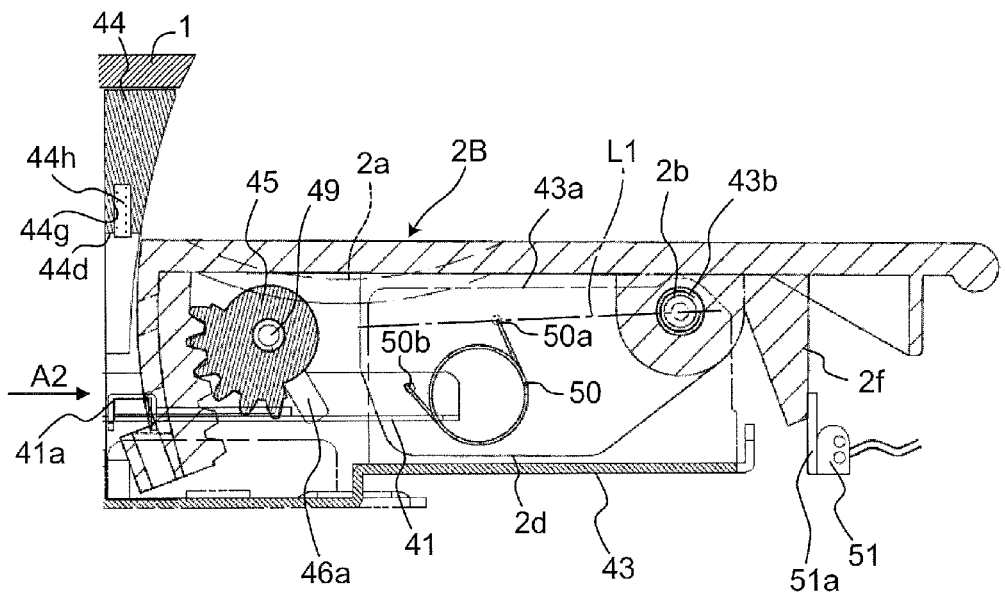
FIG. 23B is a sectional view showing a state of parts related to the lid where a disk is installed on the turntable and the lid is positioned in the open lid position.

FIG. 23B shows a state where the lid 2 is retained in the open lid position 2B. The arm portion 2f of the lid 2 brings into contact with the operation lever 51a in the process of shifting from the state shown in FIG. 23A to the state shown in FIG. 23B, and the lid opening/closing detection switch 51 is turned on. The lid opening/closing detection switch 51 functions as an eject switch for the ejection of the disk 200. That is, when the lid opening/closing switch 51 is turned on, the motor 9 of the disk drive unit 100 is driven, and an ejection operation of the disk 200 is performed. This is set as such for the following reason.

That is, a user moves the lid 2 from the closed lid position 2A to the open lid position 2B to remove the disk 200 or to insert a new disk 200. In any case, in the state shown in FIG. 23A (that is, in a case where the disk 200 is installed on the turntable 13, and the connecting rod 41 is moved in the arrow A1 direction), the disk 200 inside the disk drive unit 100 has to be ejected. Accordingly, the ejection operation of the disk 200 is preferably automatically performed when a user moves the lid 2 from the closed lid position 2A to the open lid position 2B. Thus, the lid opening/closing detection switch 51 is turned on in conjunction with the movement of the lid 2 to the open lid position 2B so as to cause the ejection operation of the disk 200 to be automatically performed.

As described above, when the ejection operation of the disk 200 is started from the state shown in FIG. 23B, the connecting rod 41 moves in the arrow A2 direction together with the slide cam member 18. The protruding portion 41a of the connecting rod 41 brings into contact with the arm portion 46a of the lid opening/closing arm 46 in accordance with this movement of the connecting rod 41.

Figure 24A:
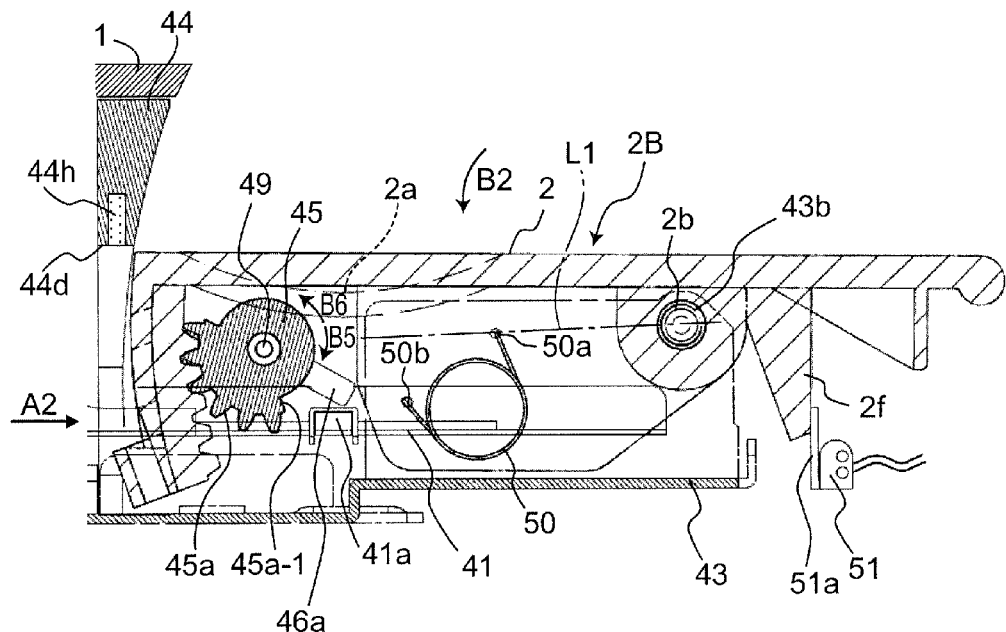
FIG. 24A is a sectional view showing a state where the protruding portion of the connecting rod is brought into contact with the arm portion of the lid opening/closing arm and only the arm portion is rotated.

The state of FIG. 24A shows a state where the protruding portion 41a of the connecting rod 41 is brought into contact with the arm portion 46a of the lid opening/closing arm 46, and only the arm portion 46a is rotated. As shown in FIG. 24A, the arm portion 46a and the protruding portion 41a are brought into contact with each other by the movement of the connecting rod 41 in the arrow A2 direction. On the other hand, the lid opening/closing gear 45 is meshed with the internal gear 2c of the lid 2 that is biased in the arrow B2 direction by the toggle spring 50, and is thus not rotated. Accordingly, the arm portion 46a of the lid opening/closing arm 46 rotates in the arrow B6 direction against the biasing force in the arrow B5 direction by the torsion coil spring 47 (refer to FIGS. 5 and 8A). That is, the protruding portion 41a of the connecting rod 41 rotates the arm portion 46a and moves in the arrow A2 direction without rotating the lid opening/closing gear 45. This movement of the connecting rod 41 stops at a position where the movement of the slide cam member 18 in the arrow A2 direction stops and the clamping state of the disk 200 is released. Then, the disk 200 is conveyed by the disk conveyance mechanism, and the disk 200 is ejected above the lid 2. The ejected state is the state shown in FIG. 24B.

Figure 24B:
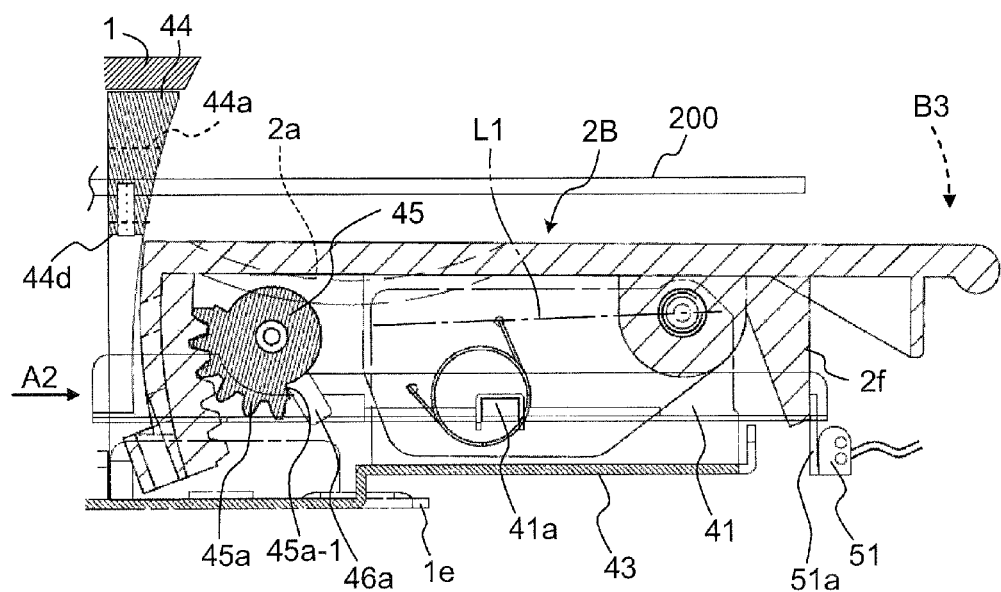
FIG. 24B is a sectional view showing a state where a disk ejection operation is completed.

FIG. 24B shows a state where the ejection operation of the disk 200 is completed. In the state shown in FIG. 24B, the connecting rod 41 is stopped at a position where it is protruded farthest to the front of the disk drive unit 100. Also, the disk 200 is in the state shown in FIG. 10. That is, the disk 200 is supported by the rubber rollers 6a to 6d and the elastic sheet 3a forming the anti-dust cover 3, and is in a non-contact state with the upper surface of the lid 2. Also, the hole formed at the center of the disk 200 is positioned opposite the concave portion 2a of the lid 2. Accordingly, a user can easily remove the disk 200 by inserting his/her finger into the hole formed at the center of the disk 200.

Additionally, to move the lid 2 from the state shown in FIG. 24B to the closed lid position 2A, a part of the lid 2 away from the disk insertion hole 44a than the rotation shaft 2b is pressed in the arrow B3 direction.

Next, a description will be given focusing on the function of the lid opening/closing block 150 including the lid opening/closing arm 46.

First, at the time of inserting the disk 200 in the closed lid state where the disk 200 is not installed, the state is manually switched to the open lid state and the disk 200 is inserted, and then, the state can be automatically switched to the closed lid state in conjunction with the installation of the disk 200. That is, as described above with reference to FIGS. 21A, 21B, 22A, 22B, and 23A, at the time of inserting the disk 200 into the disk drive unit 100 and installing the same on the turntable 13, the connecting rod 41 moves in the arrow A1 direction. The arm portion 46a of the lid opening/closing arm 46 brings into contact with the protruding portion 41a and rotates in this process of movement of the connecting rod 41. The lid opening/closing gear 45 rotates in accordance with the rotation of the arm portion 46a, and the lid 2 in the open lid position 2B rotates about the rotation shaft 2b by receiving rotation force of the lid opening/closing gear 45 from the internal gear 2c meshed with the lid opening/closing gear 45. The side plate portion 2d supporting the point of action of the toggle spring 50 configuring the retaining mechanism is also rotated by this rotation. The biasing force of the toggle spring 50 on the lid 2 is thereby switched to a lid closing direction, and the lid 2 is moved, and retained, in the closed lid position 2A.

On the other hand, when ejecting the disk 200 from the closed lid state where the disk 200 is installed on the turntable 13, the disk 200 can be ejected by manually switching to the open lid state, but at this time, switching to the closed lid state is not enabled. That is, as described above with reference to FIGS. 23A, 23B, 24A, and 24B, at the time of ejecting the disk 200 installed on the turntable 13, the connecting rod 41 moves in the arrow A2 direction. The arm portion 46a of the lid opening/closing arm 46 brings into contact with the protruding portion 41a and rotates in this process of movement of the connecting rod 41. At this time, the lid opening/closing gear 45 is meshed with the internal gear 2c of the lid 2 biased by the toggle spring 50 in the arrow B2 direction, and does not rotate. That is, the lid opening/closing arm 46 idly rotates in relation to the lid opening/closing gear 45. Accordingly, the lid 2 is retained in the open lid position 2B by the biasing force of the toggle spring 50 configuring the retaining mechanism without the state being switched to the closed lid state.

That is, in relation to insertion or ejection of the disk 200, the lid opening/closing block 150 including the lid opening/closing arm 46 functions to cause the lid 2 which have been manually moved from the closed lid position 2A to the open lid position 2B to move to the closed lid position 2A or functions to cause the lid 2 to not move to the closed lid position 2A. In other words, the lid opening/closing arm 46 transmits the rotation force of the lid opening/closing gear 45 and causes the lid 2 to close only when the connecting rod 41 moves in the arrow A1 direction at the time of insertion of the disk 200 (installation operation). Also, when the connecting rod 41 moves in the arrow A2 direction at the time of ejection of the disk 200 (installation release operation), the lid opening/closing arm 46 idly rotates, and the lid 2 is not closed and the closed state is maintained. As described, also where the lid 2 is manually opened in the same manner, the lid opening/closing block 150 including the lid opening/closing arm 46 functions to switch to the closed lid state in conjunction only at the time of insertion of the disk 200, that is, a function of a so-called one-way clutch.

Next, a positional relationship of the disk 200 and the lid 2 will be described with reference to FIGS. 25A and 25B.

Figure 25A:
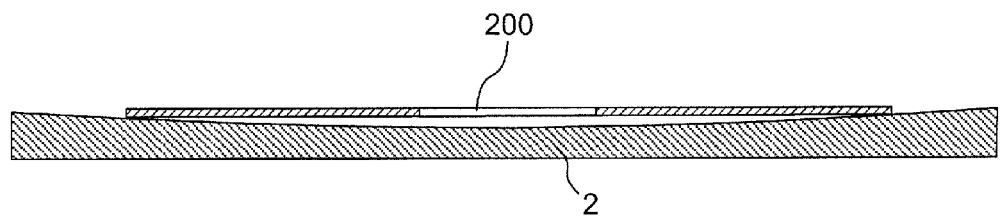
FIG. 25A is a sectional view showing a state where a disk and the lid are brought into contact with each other.

FIG. 25A shows a state where the disk 200 and the lid 2 are brought into contact with each other. As shown in FIG. 25A, the upper surface of the lid 2 is gently curved into a concave shape in the left and right direction with respect to the insertion direction of the disk. Thus, at the time of inserting the disk 200 into the disk insertion opening 1c with the upper surface of the lid 2 as a guide, only the peripheral part of the disk 200 contacts the upper surface of the lid 2, and other parts can be prevented from contacting the lid 2. Accordingly, the disk 200 can be prevented from being scratched.

When the disk 200 is inserted into the disk drive unit 100 through the slit 3b of the elastic sheet 3a, the disk 200 brings into contact with the rubber rollers 6a to 6d while being supported by the elastic sheet 3a.

Figure 25B:
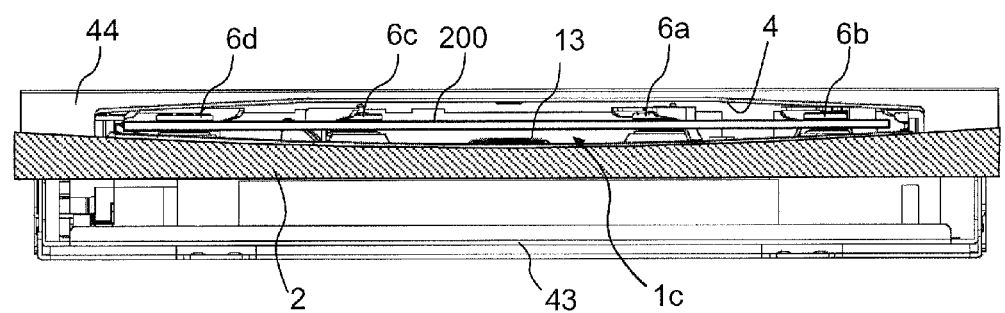
FIG. 25B is a front view showing a state where a disk is supported by a plurality of rubber rollers and an elastic sheet.

FIG. 25B shows a state where the disk 200 is supported by the rubber rollers 6a to 6d and the elastic sheet 3a. The state shown in FIG. 25B is a state where the disk 200 is inserted into the disk drive unit 100 and is supported, and it is also a state immediately after the disk 200 has been ejected from the disk drive unit 100, and this state corresponds to the planar state shown in FIG. 10 described above. At this time, the disk 200 is retained without popping outside the disk drive unit 100 by the nipping force and the frictional force of the rubber rollers 6a to 6d, and the elastic force and the frictional force of the anti-dust cover 3. Also, the disk 200 is retained without being brought into contact with the upper surface of the lid 2. Accordingly, at the time of ejection, a user can remove the disk 200 using a finger without causing the disk 200 to bring into contact with the lid 2.

Next, a control relation of the disk device according to the first embodiment of the present invention will be described with reference to FIG. 26.

Figure 26:
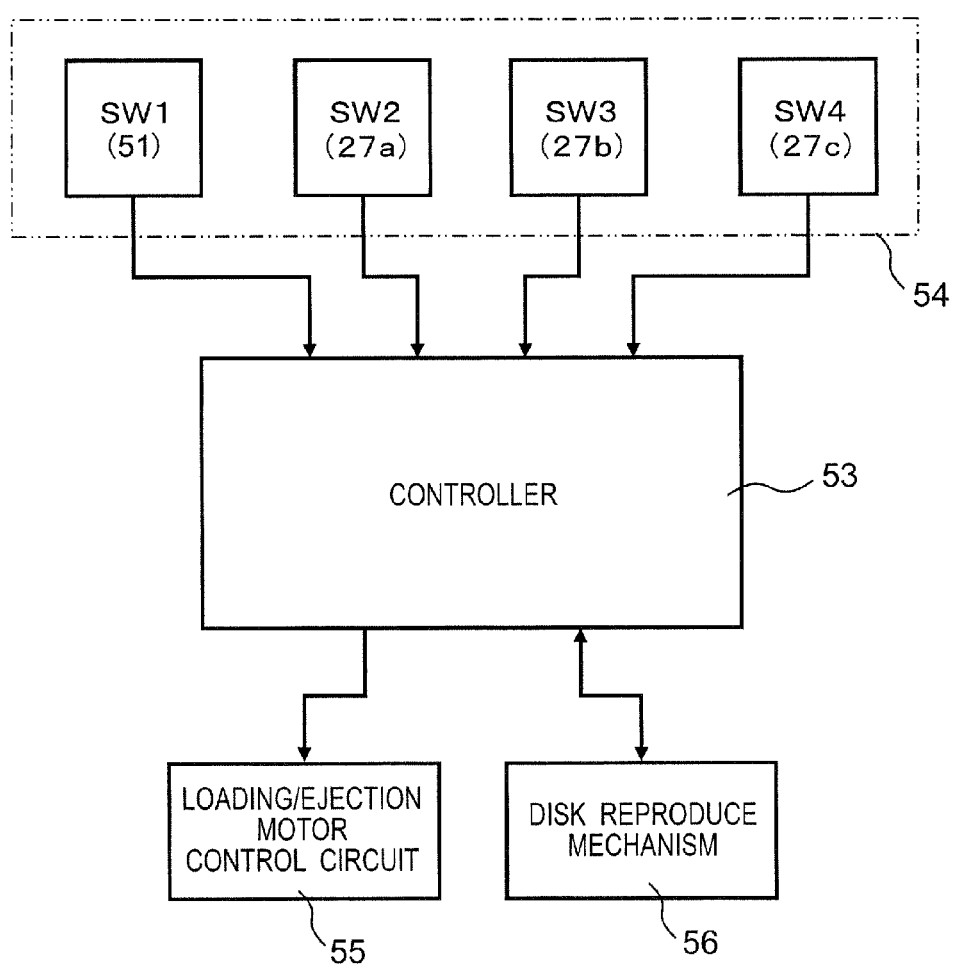
FIG. 26 is a block diagram showing a control-related configuration of the disk device according to the first embodiment of the present invention.

FIG. 26 is a block diagram showing a control-related configuration of the disk device according to the first embodiment.

In FIG. 26, the disk device according to the first embodiment includes a controller 53, a detection switch group 54, a loading/ejection motor control circuit 55, and a disk reproduce mechanism 56.

The controller 53 controls the loading/ejection motor control circuit 55 and the disk reproduce mechanism 56 based on detection information of the detection switch group 54. The detection switch group 54 includes detection switches SW1 to SW4. The detection switch SW1 corresponds to the lid opening/closing detection switch 51. The detection switch SW2 corresponds to the detection switch 27a for detecting the disk 200 inserted through the disk insertion opening 1c. The detection switch SW3 corresponds to the detection switch 27b for detecting completion of a disk conveyance operation at the time of ejection of the disk 200. The detection switch SW4 corresponds to the detection switch 27c for detecting conveyance of the disk 200 to the replayable position and installation thereof on the turntable 13. The loading/ejection motor control circuit 55 is a control circuit for controlling driving of the motor 9. The disk reproduce mechanism 56 includes devices necessary to reproduce the disk 200, such as a spindle motor, a traverse drive unit, an optical detection control unit, and a signal processing unit. The details of the disk reproduce mechanism 56 are omitted herein.

Figure 27:
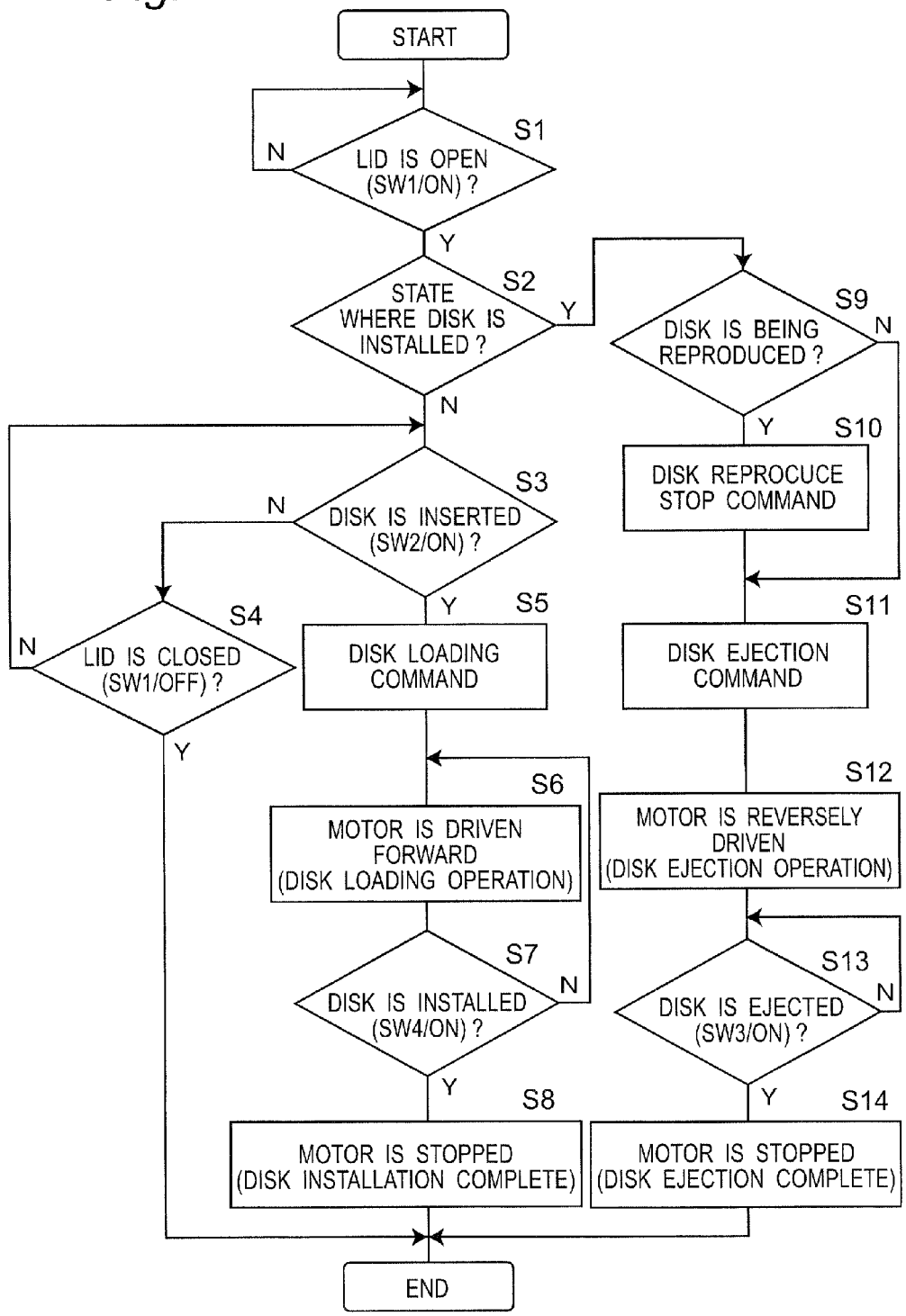
FIG. 27 is a flow chart showing a flow of control of the disk device according to the first embodiment of the present invention.

Next, a control flow of the disk device according to the first embodiment will be described with reference to FIG. 27. FIG. 27 is a flow chart showing a control flow of the disk device according to the first embodiment. Additionally, the control flow described below is carried out under the control of the controller 53.

First, in step S1, whether the lid 2 is positioned in the closed lid position 2A or not is determined. Specifically, whether the detection switch SW1 (the lid opening/closing detection switch 51) is turned on or not is determined. When the lid 2 is moved to the open lid position 2B and the detection switch SW1 is turned on, the flow proceeds to step S2.

In step S2, whether the disk 200 is installed on the turntable 13 or not is determined. Specifically, after the detection switch SW4 (the detection switch 27c) is turned on, whether the detection switch SW3 (the detection switch 27b) is turned on or not is determined. In the state where the disk 200 is not installed on the turntable 13 (the state shown in FIG. 21B), the flow proceeds to step S3. On the other hand, in the state where the disk 200 is installed on the turntable 13 (the state shown in FIG. 23B), the flow proceeds to step S9. Additionally, if a user moves the lid 2 to the open lid position 2B in the state where the disk 200 is installed on the turntable 13, it is assumed that the user wants to eject the disk 200 from the disk drive unit 100.

In step S3, whether the disk 200 is inserted into the disk insertion opening 1c or not is determined. Specifically, whether the detection switch SW2 (the detection switch 27a) is turned on or not is determined. In the case the disk 200 is not inserted into the disk insertion opening 1c, the flow proceeds to step S4. On the other hand, in the case the disk 200 is inserted into the disk insertion opening 1c, the flow proceeds to step S5.

In step S4, whether the state where the lid 2 is positioned in the open lid position 2B is continuing or not is determined. Specifically, whether the detection switch SW1 is turned off or not is determined. In the case the state where the lid 2 is positioned in the open lid position 2B is continuing, the flow proceeds to step S3. On the other hand, in the case the lid 2 is moved to the closed lid position 2A without the disk 200 being inserted (the state shown in FIG. 21A), the control flow is ended.

In step S5, the disk conveyance mechanism is controlled such that the disk 200 inserted from the disk insertion opening 1c is conveyed to the replayable position (a disk loading command). Then, the flow proceeds to step S6.

In step S6, the motor 9 is driven forward, and a disk loading operation and a disk installation operation are performed. Then, step S7 is performed. Additionally, as shown in FIGS. 22B and 23A, in the process of the disk installation operation, the lid 2 moves to the closed lid position 2A. When the disk 200 is installed on the turntable 13, and the lid 2 reaches the closed lid position 2A, the detection switch SW4 (the detection switch 27c) is turned on (the state shown in FIG. 23A).

In step S7, whether the disk 200 is installed on the turntable 13 or not is determined. Specifically, whether the detection switch SW4 (the detection switch 27c) is turned on or not is determined. If the disk 200 is not installed on the turntable 13, the flow returns to step S6. On the other hand, if the disk 200 is installed on the turntable 13, the flow proceeds to step S8.

In step S8, driving of the motor 9 is stopped (disk installation complete), and the control flow is ended.

In step S9, if the lid 2 is in the open lid position 2B, and the disk 200 is installed on the turntable 13, whether the disk 200 is being played by the disk reproduce mechanism 56 or not is determined. In the case the disk 200 is being played, the flow proceeds to step S10. In the case the disk 200 is not being played, the flow proceeds to step S11.

In step S10, the disk reproduce mechanism 56 is controlled so as to stop reproducing of the disk 200 (a disk reproduce stop command). Then, the flow proceeds to step S12.

In step S11, the disk conveyance mechanism is controlled so as to eject the disk 200 from the disk insertion opening 1c (a disk ejection command). Then, the flow proceeds to step S12.

In step S12, the motor 9 is reversely driven. A disk ejection operation is thereby started. Then, the flow proceeds to step S13. Additionally, as shown in FIGS. 24A and 24B, in the process of this disk ejection operation, the connecting rod 41 moves in the arrow A2 direction.

In step S13, whether the disk ejection operation is completed (the state shown in FIG. 24B) or not is determined. Specifically, whether the detection switch SW3 (the detection switch 27b) is turned on or not is determined. If the disk ejection operation is determined to be completed, the flow proceeds to step S14.

In step S14, driving of the motor 9 is stopped (disk ejection complete), and the control flow is ended. Additionally, at this time, as shown in FIG. 24B, the disk 200 is supported by the rubber rollers 6a to 6d, and the elastic sheet 3a forming the anti-dust cover 3, and is retained in a non-contact state with the upper surface of the lid 2.

As described above, the subsequent control flow is different depending on whether the disk 200 is installed on the turntable 13 or not when the lid 2 is moved to the open lid position 2B. In the case the disk 200 is not installed on the turntable 13, if the disk 200 is inserted from the disk insertion opening 1c, the lid 2 is automatically moved from the open lid position 2B to the closed lid position 2A in conjunction with the disk installation operation. On the other hand, in the case the disk 200 is installed on the turntable 13, the disk ejection operation is automatically performed in conjunction with the movement of the lid 2 from the closed lid position 2A to the open lid position 2B.

As described above, according to the first embodiment, since the disk drive unit 100 is accommodated inside the outer case 1, and the lid 2 is provided to be able to open or close the opening portion 1b of the outer case 1, foreign matters may be prevented from entering the disk drive unit 100.

Also, according to the first embodiment, since the front wall 1a of the outer case 1 has an inclined surface, and the lid 2 is configured to be flush with the inclined surface, a disk device having a design according to which the thickness is not noticeable may be provided. Also, unlike the front panel of Patent Document 2, no protruding operation buttons and the like are provided to the lid 2, and the disk 200 or the lid 2 may be prevented from being scratched.

Furthermore, according to the first embodiment, opening and closing of the opening portion 1b of the outer case 1 may be realized by a simple configuration of causing the lid 2 to rotate about the rotation shaft 2b positioned in front of the disk insertion opening 1c.

Furthermore, according to the first embodiment, the lid 2 is configured to rotate to the open lid position 2B by being pressed at a part more to the side of the disk insertion opening 1c than the rotation shaft 2b while being positioned in the closed lid position 2A, and to rotate to the closed lid position 2A by being pressed at a part away from the disk insertion opening 1c than the rotation shaft 2b while being positioned in the open lid position 2B. Accordingly, the lid 2 can be moved to the closed lid position 2A or to the open lid position 2B by a simple operation.

Moreover, according to the first embodiment, since the concave portion 2a where a finger may enter is formed on the upper surface of the lid 2, a user may easily hold the disk 200 by inserting his/her finger into the concave portion 2a through the hole provided at the center of the disk 200.

Also, the disk device according to the first embodiment is configured such that the disk 200 and the lid 2 are in a non-contact state when the disk 200 is inserted into the slit 3b of the elastic sheet 3a, and is supported by the elastic sheet 3a and nipped by the rubber rollers 6a to 6d. Accordingly, the disk 200 may be ejected without contacting the lid 2 at the time of ejection of the disk 200, and the disk 200 or the lid 2 may be prevented from being scratched.

Furthermore, the disk device according to the first embodiment includes the retaining mechanism that retains the lid 2 which has been moved to the closed lid position 2A in the closed lid position 2A, and also, retains the lid 2 which has been moved to the open lid position 2B in the open lid position 2B, and the lid opening/closing switching mechanism that switches the retaining state by the retaining mechanism in association with the opening or closing of the lid 2. Here, in the first embodiment, the retaining mechanism is configured by the toggle spring 50 provided between the side plate portion 2d of the lid 2 and the bearing plate 43a of the frame 43, and retains both states of the closed lid position 2A and the open lid position 2B of the lid 2 by the biasing force of the toggle spring 50. Also, in the first embodiment, the lid opening/closing switching mechanism is configured by the lid opening/closing gear block 150, the lock washer 48, and the gear shaft 49. However, the present invention is not restricted to such. Also, the disk device according to the first embodiment is configured such that when the lid 2 is positioned in the open lid position 2B, and the disk installation mechanism operates to install the disk 200 on the turntable 13, the retaining mechanism is switched, in conjunction with the operation and by the lid opening/closing switching mechanism, from the state of retaining the lid 2 in the open lid position 2B to the state of retaining the lid 2 in the closed lid position 2A. Accordingly, the installation of the disk 200 on the turntable 13 and the movement of the lid 2 to the closed lid position 2A may be performed as a series of operations by a simple operation of moving the lid 2 to the open lid position 2B and inserting the disk 200 into the disk insertion opening 1c.

Furthermore, the disk device according to the first embodiment is configured such that when the lid 2 is moved from the closed lid position 2A to the open lid position 2B with the disk 200 installed on the turntable 13, the disk conveyance mechanism ejects the disk 200 to the disk insertion opening 1c, and the retaining mechanism maintains the state where the lid 2 is retained in the open lid position 2B without having the state where the lid 2 is retained in the open lid position 2B switched by the lid opening/closing switching mechanism. Accordingly, the disk 200 installed on the turntable 13 may be automatically ejected from the disk insertion opening 1c simply by moving the lid 2 from the closed lid position 2A to the open lid position 2B. Also, at this time, ejection of the disk 200 is not interrupted by the lid 2.

Moreover, according to the first embodiment, the lid opening/closing switching mechanism includes the lid opening/closing arm 46 as a one-way clutch, and thus, a configuration where the lid 2 is moved to the closed lid position 2A at the time of disk insertion, in conjunction with the disk installation operation, and where the lid 2 is retained in the open lid position 2B at the time of disk ejection regardless of the disk ejection operation may be easily realized.

(Second Embodiment)

Figure 28:
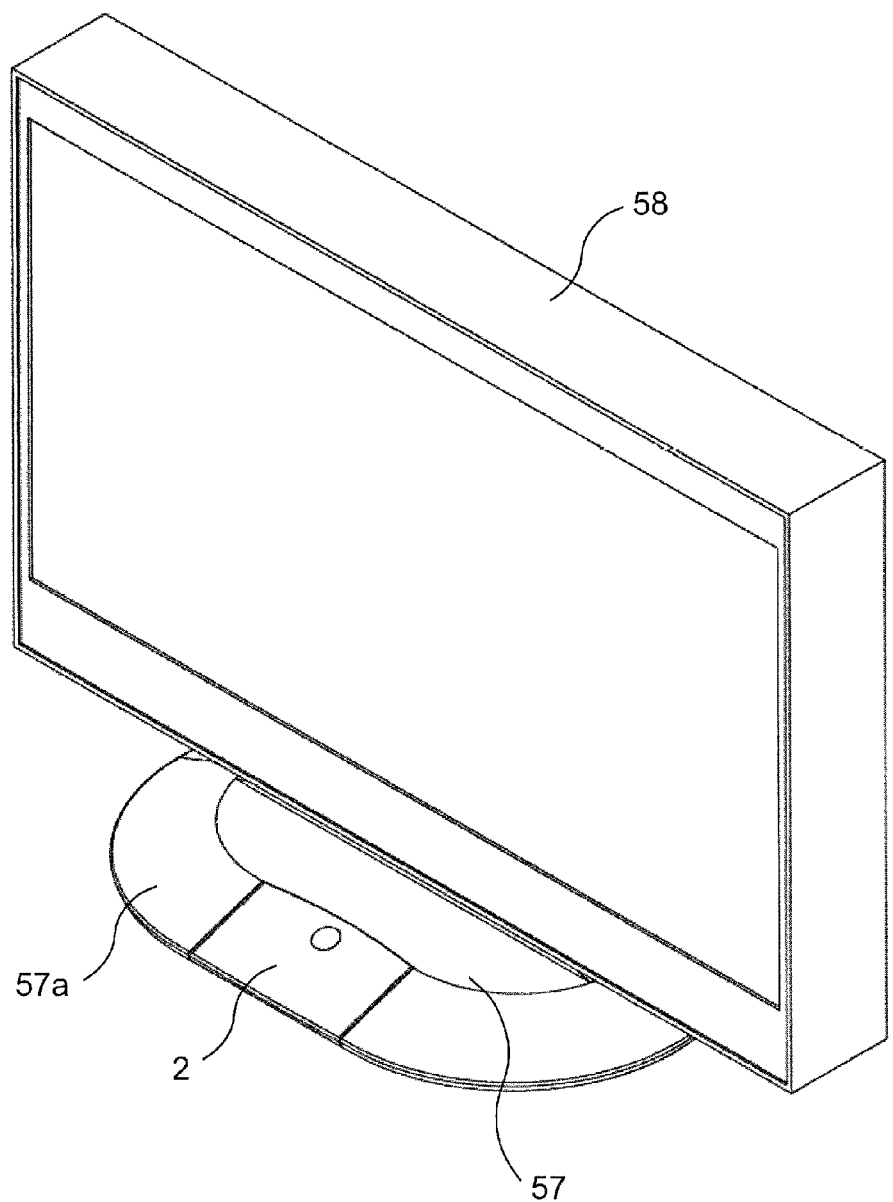
FIG. 28 is a perspective view showing a television set provided with a disk device according to a second embodiment of the present invention.

FIG. 28 is a perspective view showing a television set provided with a disk device according to a second embodiment of the present invention.

In FIG. 28, the television set provided with a disk device according to the second embodiment includes a television set main body 58, and a pedestal 57 that supports the television set main body 58. The pedestal 57 has the same configuration as the outer case 1. That is, a front wall 57a of the pedestal 57 has an inclined surface that is inclined such that its lower part is the forward part. Also, a lid 2 is provided so as to cover an opening portion formed to the front wall 57a while allowing the opening portion to be opened or closed. Additionally, although not shown, a disk drive unit 100 is embedded in the pedestal 57.

According to the second embodiment, like the outer case 1, the pedestal 57 is configured to include an inclined surface at the front wall, and thus, by forming an opening/closing lid using the inclined surface of the front wall, a disk device-embedded television set having a design according to which the thickness is not noticeable may be provided.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of Japanese Patent Application No. 2010-230219 filed on Oct. 13, 2010, including specification, drawings, and claims is incorporated herein by reference in its entirety.

INDUSTRIAL APPLICABILITY

The disk device of the present invention is embedded in an outer case that prevents entering of foreign matters and the has an inclined surface at the front wall, and forms an opening/closing lid using the inclined surface of the front wall, to thereby realize a design according to which the thickness is not noticeable, and thus, the disk device is useful as a slot-in disk device that is used by being integrated with another electrical device such as a television set.

The invention claimed is:

1. A slot-in disk device comprising:
an outer case having a front wall, the front wall including a lid, an opening portion, and an inclined surface which is inclined downwardly;
a disk conveyance mechanism which conveys a disk inserted from a disk insertion opening to a replayable position;
a disk installation mechanism which installs the disk conveyed to the replayable position on a turntable such that the disk is in a replayable clamping state; and
a rotation shaft disposed at a side of the opening portion in front of the disk insertion opening,
wherein the opening portion of the front wall of the outer case allows insertion of the disk into the disk insertion opening, and the lid covers the opening portion and allows the opening portion to be opened or closed, wherein the lid is configured to move by rotating about the rotation shaft in a direction crossing a disk conveyance direction between an open lid position in which the disk insertion opening is exposed to an outside of the outer case and the disk can be guided to the disk insertion opening and a closed lid position in which the lid is flush with the inclined surface and the disk insertion opening is not exposed to the outside of the outer case, wherein the lid is configured to rotate to the open lid position by being pressed, in a state of being positioned in the closed lid position, at a part more to a side of the disk insertion opening than the rotation shaft, and wherein the lid is configured to rotate to the closed lid position by being pressed, in a state of being positioned in the open lid position, at a part farther away from the disk insertion opening than the rotation shaft.

2. The slot-in disk device of claim 1, wherein the disk conveyance mechanism includes a plurality of disk conveying rollers which convey the disk inserted from the disk insertion opening to the replayable position, wherein an anti-dust cover formed from an elastic sheet provided with a slit through which the disk passes is attached to the disk insertion opening, and wherein, when the disk is inserted into the slit and supported by the elastic sheet, and is nipped by the plurality of disk conveying rollers, the disk and the lid are in a non-contact state with each other.

3. The slot-in disk device of claim 1, wherein the outer case forms a pedestal of a television set.

4. The slot-in disk device of claim 1, further comprising:

a retaining mechanism which retains the lid which has been moved to the closed lid position in the closed lid position, and which retains the lid which has been moved to the open lid position in the open lid position; and a lid opening/closing switching mechanism which switches a retaining state by the retaining mechanism in association with opening or closing of the lid, wherein, when the disk installation mechanism operates to install the disk on the turntable in a state where the lid is positioned in the open lid position, the retaining mechanism is switched, in conjunction with the operation and by the lid opening/closing switching mechanism, from a state where the retaining mechanism retains the lid in the open lid position to a state where the retaining mechanism retains the lid in the closed lid position.

5. The slot-in disk device of claim 1, further comprising:

a lid opening/closing gear; and a toggle spring which biases the lid, wherein the lid includes an internal gear which engages with the lid opening/closing gear such that the lid is movable with rotation of the lid opening/closing gear, and wherein the toggle spring is connected to the lid such that one end of the toggle spring moves with the lid and changes a direction in which the toggle spring biases the lid.

6. The slot-in disk device of claim 1, further comprising:

a motor;

a controller which controls the motor;

a lid opening/closing gear;

a lid opening/closing arm connected to the lid opening/closing gear; and a connecting rod which is driven by the motor and engages the lid opening/closing arm, wherein the lid includes an internal gear which engages the lid opening/closing gear such that the lid is movable with rotation of the lid opening/closing gear, wherein the lid is closable by driving the connecting rod with the motor such that the connecting rod engages the lid opening/closing arm and rotates the lid opening/closing gear, wherein the lid opening/closing arm transmits rotation force to the lid opening/closing gear when the connecting rod is moved in a first direction, and the lid opening/closing arm rotates relative to the lid opening/closing gear and does not transmit rotation force when the connecting rod is moved in a second direction opposite to the first direction, and wherein the controller controls a position of the connecting rod such that the lid is automatically closed after the disk is inserted into the disk insertion opening, and the lid is retained open after the disk is ejected from the disk insertion opening.

7. A slot-in disk device comprising:

an outer case having a front wall, the front wall including a lid, an opening portion, and an inclined surface which is inclined downwardly;

a disk conveyance mechanism which conveys a disk inserted from a disk insertion opening to a replayable position;

a disk installation mechanism which installs the disk conveyed to the replayable position on a turntable such that the disk is in a replayable clamping state; and a rotation shaft disposed at a side of the opening portion in front of the disk insertion opening, wherein the opening portion of the front wall of the outer case allows insertion of the disk into the disk insertion opening, and the lid covers the opening portion and allows the opening portion to be opened or closed, wherein the lid is configured to move by rotating about the rotation shaft in a direction crossing a disk conveyance direction between an open lid position in which the disk insertion opening is exposed to an outside of the outer case and the disk can be guided to the disk insertion opening and a closed lid position in which the lid is flush with the inclined surface and the disk insertion opening is not exposed to the outside of the outer case, wherein the disk conveyance mechanism is configured to eject the disk conveyed to the replayable position to the disk insertion opening, and wherein the lid includes a concave portion into which a finger enters at a part of the lid that faces a hole formed at a center of the disk ejected from the disk insertion opening by the disk conveyance mechanism when the lid is positioned in the open lid position.

8. The slot-in disk device of claim 7, wherein the disk conveyance mechanism includes a plurality of disk conveying rollers which convey the disk inserted from the disk insertion opening to the replayable position, wherein an anti-dust cover formed from an elastic sheet provided with a slit through which the disk passes is attached to the disk insertion opening, and wherein, when the disk is inserted into the slit and supported by the elastic sheet, and is nipped by the plurality of disk conveying rollers, the disk and the lid are in a non-contact state with each other.

9. The slot-in disk device of claim 7, wherein the outer case forms a pedestal of a television set.

10. The slot-in disk device of claim 7, further comprising:
a retaining mechanism which retains the lid which has been moved to the closed lid position in the closed lid position, and which retains the lid which has been moved to the open lid position in the open lid position; and
a lid opening/closing switching mechanism which switches a retaining state by the retaining mechanism in association with opening or closing of the lid,
wherein, when the disk installation mechanism operates to install the disk on the turntable in a state where the lid is positioned in the open lid position, the retaining mechanism is switched, in conjunction with the operation and by the lid opening/closing switching mechanism, from a state where the retaining mechanism retains the lid in the open lid position to a state where the retaining mechanism retains the lid in the closed lid position.

11. The slot-in disk device of claim 7, further comprising:
a lid opening/closing gear; and
a toggle spring which biases the lid,
wherein the lid includes an internal gear which engages with the lid opening/closing gear such that the lid is movable with rotation of the lid opening/closing gear, and
wherein the toggle spring is connected to the lid such that one end of the toggle spring moves with the lid and changes a direction in which the toggle spring biases the lid.

12. The slot-in disk device of claim 7, further comprising:
a motor;
a controller which controls the motor;
a lid opening/closing gear;
a lid opening/closing arm connected to the lid opening/closing gear; and
a connecting rod which is driven by the motor and engages the lid opening/closing arm,
wherein the lid includes an internal gear which engages the lid opening/closing gear such that the lid is movable with rotation of the lid opening/closing gear,
wherein the lid is closable by driving the connecting rod with the motor such that the connecting rod engages the lid opening/closing arm and rotates the lid opening/closing gear,
wherein the lid opening/closing arm transmits rotation force to the lid opening/closing gear when the connecting rod is moved in a first direction, and the lid opening/closing arm rotates relative to the lid opening/closing gear and does not transmit rotation force when the connecting rod is moved in a second direction opposite to the first direction, and
wherein the controller controls a position of the connecting rod such that the lid is automatically closed after the disk is inserted into the disk insertion opening, and the lid is retained open after the disk is ejected from the disk insertion opening.

13. A slot-in disk device comprising:
an outer case having a front wall, the front wall including a lid, an opening portion, and an inclined surface which is inclined downwardly;
a disk conveyance mechanism which conveys a disk inserted from a disk insertion opening to a replayable position;
a disk installation mechanism which installs the disk conveyed to the replayable position on a turntable such that the disk is in a replayable clamping state; and
a rotation shaft disposed at a side of the opening portion in front of the disk insertion opening,
wherein the opening portion of the front wall of the outer case allows insertion of the disk into the disk insertion opening, and the lid covers the opening portion and allows the opening portion to be opened or closed,
wherein the lid is configured to move by rotating about the rotation shaft in a direction crossing a disk conveyance direction between an open lid position in which the disk insertion opening is exposed to an outside of the outer case and the disk can be guided to the disk insertion opening and a closed lid position in which the lid is flush with the inclined surface and the disk insertion opening is not exposed to the outside of the outer case,
wherein the slot-in disk device further comprises:
a retaining mechanism which retains the lid which has been moved to the closed lid position in the closed lid position, and which retains the lid which has been moved to the open lid position in the open lid position; and
a lid opening/closing switching mechanism which switches a retaining state of the retaining mechanism in association with opening or closing of the lid,
wherein, when the disk installation mechanism operates to install the disk on the turntable in a state where the lid is positioned in the open lid position, the retaining mechanism is switched, in conjunction with the operation and by the lid opening/closing switching mechanism, from a state where the retaining mechanism retains the lid in the open lid position to a state where the retaining mechanism retains the lid in the closed lid position,
wherein the disk conveyance mechanism is configured to eject the disk conveyed to the replayable position to the disk insertion opening, and
wherein, when the lid is moved from the closed lid position to the open lid position in a state where the disk is installed on the turntable, the disk conveyance mechanism ejects the disk to the disk insertion opening, and the lid is retained in the open lid position and the lid opening/closing switching mechanism does not switch the retaining state of the retaining mechanism.

14. The slot-in disk device of claim 13,
wherein the disk conveyance mechanism includes a plurality of disk conveying rollers which convey the disk inserted from the disk insertion opening to the replayable position,
wherein an anti-dust cover formed from an elastic sheet provided with a slit through which the disk passes is attached to the disk insertion opening, and
wherein, when the disk is inserted into the slit and supported by the elastic sheet, and is nipped by the plurality of disk conveying rollers, the disk and the lid are in a non-contact state with each other.

15. The slot-in disk device of claim 13, wherein the outer case forms a pedestal of a television set.

16. The slot-in disk device of claim 13, further comprising:
a lid opening/closing gear; and
a toggle spring which biases the lid,
wherein the lid includes an internal gear which engages with the lid opening/closing gear such that the lid is movable with rotation of the lid opening/closing gear, and
wherein the toggle spring is connected to the lid such that one end of the toggle spring moves with the lid and changes a direction in which the toggle spring biases the lid.

17. A slot-in disk device of comprising:
an outer case having a front wall, the front wall including a lid, an opening portion, and an inclined surface which is inclined downwardly;
a disk conveyance mechanism which conveys a disk inserted from a disk insertion opening to a replayable position;
a disk installation mechanism which installs the disk conveyed to the replayable position on a turntable such that the disk is in a replayable clamping state; and
a rotation shaft disposed at a side of the opening portion in front of the disk insertion opening,
wherein the opening portion of the front wall of the outer case allows insertion of the disk into the disk insertion opening, and the lid covers the opening portion and allows the opening portion to be opened or closed,
wherein the lid is configured to move by rotating about the rotation shaft in a direction crossing a disk conveyance direction between an open lid position in which the disk insertion opening is exposed to an outside of the outer case and the disk can be guided to the disk insertion opening and a closed lid position in which the lid is flush with the inclined surface and the disk insertion opening is not exposed to the outside of the outer case,
wherein the slot-in disk device further comprises:
 a retaining mechanism which retains the lid which has been moved to the closed lid position in the closed lid position, and which retains the lid which has been moved to the open lid position in the open lid position; and
 a lid opening/closing switching mechanism which switches a retaining state of the retaining mechanism in association with opening or closing of the lid,
wherein, when the disk installation mechanism operates to install the disk on the turntable in a state where the lid is positioned in the open lid position, the retaining mechanism is switched, in conjunction with the operation and by the lid opening/closing switching mechanism, from a state where the retaining mechanism retains the lid in the open lid position to a state where the retaining mechanism retains the lid in the closed lid position,
wherein the disk conveyance mechanism is configured to eject the disk conveyed to the replayable position to the disk insertion opening,
wherein, when the lid is moved from the closed lid position to the open lid position in a state where the disk is installed on the turntable, the disk conveyance mechanism ejects the disk to the disk insertion opening, and the lid is retained in the open lid position and the lid opening/closing switching mechanism does not switch the retaining state of the retaining mechanism, and
wherein the lid opening/closing switching mechanism includes a one-way clutch that acts only at a time of disk insertion and that switches from a retaining state of the open lid position by the retaining mechanism to a retaining state of the closed lid position.

18. The slot-in disk device of claim 17,
wherein the disk conveyance mechanism includes a plurality of disk conveying rollers which convey the disk inserted from the disk insertion opening to the replayable position,
wherein an anti-dust cover formed from an elastic sheet provided with a slit through which the disk passes is attached to the disk insertion opening, and
wherein, when the disk is inserted into the slit and supported by the elastic sheet, and is nipped by the plurality of disk conveying rollers, the disk and the lid are in a non-contact state with each other.

19. The slot-in disk device of claim 17, wherein the outer case forms a pedestal of a television set.

20. The slot-in disk device of claim 17, further comprising:
a lid opening/closing gear; and
a toggle spring which biases the lid,
wherein the lid includes an internal gear which engages with the lid opening/closing gear such that the lid is movable with rotation of the lid opening/closing gear, and
wherein the toggle spring is connected to the lid such that one end of the toggle spring moves with the lid and changes a direction in which the toggle spring biases the lid.

* * * * *